US006944430B2

(12) United States Patent
Berstis

(10) Patent No.: US 6,944,430 B2
(45) Date of Patent: Sep. 13, 2005

(54) METHOD AND APPARATUS FOR AUTOMOTIVE RADIO TIME SHIFTING PERSONALIZED TO MULTIPLE DRIVERS

(75) Inventor: Viktors Berstis, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 714 days.

(21) Appl. No.: 09/863,909

(22) Filed: May 23, 2001

(65) Prior Publication Data

US 2001/0034220 A1 Oct. 25, 2001

Related U.S. Application Data

(62) Division of application No. 09/239,244, filed on Jan. 28, 1999.

(51) Int. Cl.[7] .............................. H04B 1/18; G11B 21/08
(52) U.S. Cl. ...................... 455/186.1; 455/345; 369/6; 369/30.08
(58) Field of Search ........................... 455/180.1, 185.1, 455/186.1, 344, 345, 412.1; 369/2, 6, 7, 10, 29.02, 30.01, 30.08; 386/46, 83

(56) References Cited

U.S. PATENT DOCUMENTS

| | | | |
|---|---|---|---|
| 4,635,121 A | 1/1987 | Hoffman et al. ............ 358/188 |
| 5,075,771 A | 12/1991 | Hashimoto .................... 358/84 |
| 5,168,481 A | * 12/1992 | Culbertson et al. ............ 369/6 |
| 5,661,787 A | 8/1997 | Pocock ................... 379/101.01 |
| 5,977,964 A | 11/1999 | Williams et al. ............. 345/327 |
| 6,035,329 A | 3/2000 | Mages et al. ................ 709/217 |
| 6,038,199 A | * 3/2000 | Pawlowski et al. ....... 369/29.02 |

FOREIGN PATENT DOCUMENTS

WO    WO 97/47135    12/1997    ............ H04N/7/00

* cited by examiner

*Primary Examiner*—Quochien B. Vuong
(74) *Attorney, Agent, or Firm*—Duke W. Yee; Jeffrey S. LaBaw; Francis Lammes

(57) ABSTRACT

A plurality of users each selects desired listening broadcast programs that are recorded by a system in a memory and indexed to the specific user. The user may also select the desired playback schedule and playback format. Conveniently, the system retrieves recorded broadcast programs stored in memory, then plays them according to the specific user's desired format and schedule. Additionally, each user may select which broadcast programs are stored, which broadcast frequencies are scanned by the system for the desired broadcast programs, and how long each broadcast program is stored in memory.

21 Claims, 12 Drawing Sheets

FIG. 22

| | BROADCAST EVENT ID 2202 | | RECORD PREFERENCES 2204 | | | PLAYBACK SCHEDULING PREFERENCES 2206 | | | RETENTION 2208 | | | PLAYBACK FORMAT 2210 | |
|---|---|---|---|---|---|---|---|---|---|---|---|---|---|
| | 2213 | 2215 | 2217 | 2219 | 2221 | 2223 | 2225 | 2227 | 2229 | 2231 | 2233 | 2235 | 2237 |
| | TOPIC | TITLE | FREQUENCY | DAY | TIME | PLAYBACK TOPIC PRIORITY | PLAYBACK TITLE PRIORITY | TOPIC RETENTION PRIORITY | TITLE RETENTION PRIORITY | NUMBER OF COPIES RETAINED | MEMORY STACKING | PLAYBACK TOPIC FORMAT | PLAYBACK TITLE FORMAT |
| 2212 | | | | | | | | | | | | | |
| 2214 | NEWS | -- | 590AM | M-F | :05-:10 | Imp | -- | 10Hr | -- | 1 | MONO | DISCONTINUOUS/ PICKUP | -- |
| 2216 | TRAFFIC REPORT | -- | 880AM | M-F | :10-:15 | Imp | -- | 10Hr | -- | 1 | MONO | CONTINUOUS | -- |
| 2218 | WEATHER | -- | SCAN 880AM 90.5FM | S-S | -- | Inf | -- | 24Hr | -- | 1 | MONO | DISCONTINUOUS/ PICKUP | -- |
| 2220 | WEEKLY TALK | WASH WEEK REVIEW | SCAN 90.5FM | Su | -- | Inf | 50 | 50Hr | STORE UNTIL PLAYBACK | 3 | MONO COM:20 | DISCONTINUOUS/ PICKUP | DISCONTINUOUS/ PICKUP |
| 2222 | WEEKLY TALK | CAR TALK | 90.5FM | Sa | 5PM-6PM | Inf | 20 | 50Hr | STORE UNTIL PLAYBACK | 3 | MONO COM:10 | DISCONTINUOUS/ PICKUP | DISCONTINUOUS/ REPLAY |
| 2224 | ENTERTAINMENT | MUSIC PROGRAMMING | KMFM | S-S | -- | Ent | 5 | -- | NO STORE | -- | STEREO | -- | BACKGROUND |
| 2226 | ONE TIME | CLINTON | 590AM | Mon | 8PM-10PM | O-D | 5 | 50Hr | PERMANENT | 1 | MONO COM:10 | DISCONTINUOUS/ PICKUP | CONTINUOUS |

METHOD AND APPARATUS FOR AUTOMOTIVE RADIO TIME SHIFTING PERSONALIZED TO MULTIPLE DRIVERS

This application is a division of Ser. No. 09/239,244 filed Jan. 28, 1999.

BACKGROUND OF THE INVENTION

1. Technical Field

The present invention relates to a vehicle onboard computer system for controlling various vehicle onboard systems and subsystems. More specifically, the present invention relates to a system and method for implementing user specific preferences on the vehicle onboard computer system for regulating the operation of a vehicle audio subsystem. Still more particularly, the present invention relates to a system and method for identifying and authorizing users and implementing user specific parameters associated with the users with respect to the storing and playback of broadcast events.

2. Description of Related Art

It has been well known in prior art to limit the access and operation of a vehicle by granting authority of the user to operate a vehicle with such devices as a mechanical key. In the prior art, any person who obtained the mechanical key could generally operate the vehicle.

As the sophistication and comfort of the vehicles increased, the number of vehicle systems and subsystems increased proportionally. The audio subsystem of a vehicle provides the vehicle operator with entertainment that eases the boredom associated with the mundane routine of operating the vehicle. In addition, news, traffic and weather broadcasts allow the user to better plan a safer and more efficient route. One problem associated with prior art audio subsystems is that the audio preferences are not indexed by user. Other problems are that the user might not be aware of the exact broadcast time of a broadcast event or the user might be preoccupied with operating the vehicle and unable to tune the audio receiver to the broadcast frequency. Therefore, it would be advantageous to have an improved method and apparatus for adjusting user specific preferences for recording and playback of broadcast events in a vehicle.

SUMMARY OF THE INVENTION

A plurality of users each selects desired listening broadcast programs that are recorded by a system in a memory and indexed to the specific user. The user may also select the desired playback schedule and playback format. Conveniently, the system retrieves recorded broadcast programs stored in memory, then plays them according to the specific user's desired format and schedule. Additionally, each user may select which broadcast programs are stored, which broadcast frequencies are scanned by the system for the desired broadcast programs, and how long each broadcast program is stored in memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings wherein:

FIG. 13B illustrates the playback mode of the present invention in more detail.

FIG. 22 illustrates an example of a set of user specific preferences for the audio system.

DETAILED DESCRIPTION OF THE PREFERRED EMBODIMENT

The present invention provides for a method and means for implementing user specific preferences to onboard systems on a vehicle. Heretofore user specific preferences were unknown because the onboard systems could not discriminate between users' identities but would instead discriminate between access keys, either mechanical or personal identification numbers. The present invention incorporates user verification for positively verifying the user and indexing user specific preferences to that user whereby the user need not make adjustments to the various onboard systems each time the user accesses the vehicle. The present invention is described herein with reference to a preferred embodiment of the onboard systems (FIGS. 1 to 11), a process for practicing the present invention implemented on the onboard system (FIGS. 12 and 13) and finally, with respect to an embodiment of a data structure used in conjunction with the process (FIGS. 14 to 22).

Figure 1:
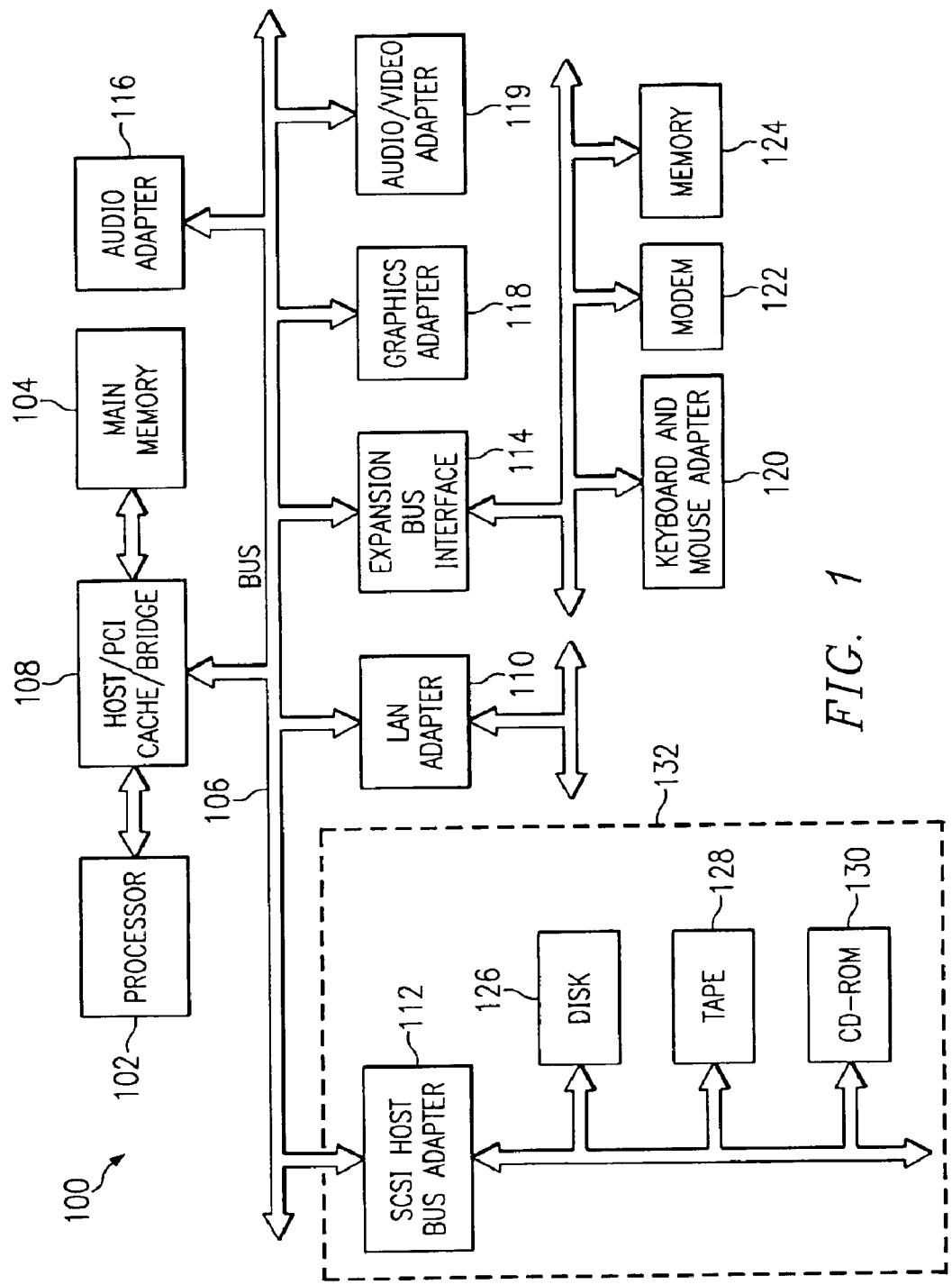
FIG. 1 depicts a block diagram illustrating a data processing system of the present invention.

With reference now to FIG. 1, a block diagram illustrates a data processing system in which the present invention may be implemented. Data Processing system 100 is an example of a client computer. Data Processing system 100 employs a peripheral component interconnect (PCI) local bus architecture. Although the depicted example employs a PCI bus, other bus architectures such as Micro Channel and ISA may be used. Processor 102 and Main Memory 104 are connected to PCI local Bus 106 through Host/PCI Cache/Bridge 108. Host/PCI Cache/Bridge 108 also may include an integrated memory controller and cache memory for Processor 102. Additional connections to PCI local Bus 106 may be made through direct component interconnection or through add-in boards. In the depicted example, Local Area Network (LAN) Adapter 110, SCSI Host Bus Adapter 112, and Expansion Bus Interface 114 are connected to PCI local Bus 106 by direct component connection. In contrast, Audio Adapter 116, Graphics Adapter 118, and Audio/Video Adapter (A/V) 119 are connected to PCI local Bus 106 by add-in boards inserted into expansion slots. Expansion Bus Interface 114 provides a connection for a Keyboard and Mouse Adapter 120, Modem 122, and additional Memory 124. Additional Memory 124 may consist of any type of memory including flash memory. SCSI Host Bus Adapter 112 provides a connection for hard Disk drive 126, Tape drive 128, and CD-ROM drive 130. Typical PCI local bus implementations will support three or four PCI expansion slots or add-in connectors.

An operating system runs on Processor 102 and is used to coordinate and provide control of various components within Data Processing system 100 in FIG. 1. The operating system may be a commercially available operating system such as OS/2, which is available from International Business Machines Corporation. "OS/2" is a trademark of International Business Machines Corporation. The operating system may also be a real time operating system (RTOS), such as QNX Neutrino™ from QNX Software Systems Ltd., 175 Terranence Matthews Crescent, Kanata, Ontario, Canada K2MLW8. An object oriented programming system such as Java may run in conjunction with the operating system and provide calls to the operating system from Java programs or applications executing on Data Processing system 100 via a Java Virtual Machine. "Java" is a trademark of Sun Microsystems, Inc. Instructions for the operating system, the object-oriented operating system, and applications or programs are located on storage devices, such as hard Disk drive 126, and may be loaded into Main Memory 104 for execution by Processor 102.

Those of ordinary skill in the art will appreciate that the hardware in FIG. 1 may vary depending on the implementation. Other internal hardware or peripheral devices, such as flash ROM (or equivalent nonvolatile memory) or optical disk drives and the like, may be used in addition to or in place of the hardware depicted in FIG. 1. Also, the processes of the present invention may be applied to a multiprocessor data processing system.

For example, Data Processing system 100, if optionally configured as a network computer, may not include SCSI Host Bus Adapter 112, hard Disk drive 126, Tape drive 128, and CD-ROM 130, as noted by dotted line 132 in FIG. 1 denoting optional inclusion. In that case, the computer, to be properly called a client computer, must include some type of network communication interface, such as LAN Adapter 110, Modem 122, or the like. For mobile vehicle applications, the preferred network communication interface might be a wireless network circuit for communicating digital packets of information to and from the central fleet server. As another example, Data Processing system 100 may be a stand-alone system configured to be bootable without relying on some type of network communication interface, whether or not Data Processing system 100 comprises some type of network communication interface. As a further example, Data Processing system 100 may be a Personal Digital Assistant (PDA) device which is configured with ROM and/or flash ROM in order to provide non-volatile memory for storing operating system files and/or user-generated data.

The depicted example in FIG. 1 and above-described examples are not meant to imply architectural limitations with respect to the present invention. Although FIG. 1 provides examples of configurations of computer systems on which the present invention may execute, the following background information may provide a context for understanding the overall computing environment in which the present invention may be used.

Figure 2:
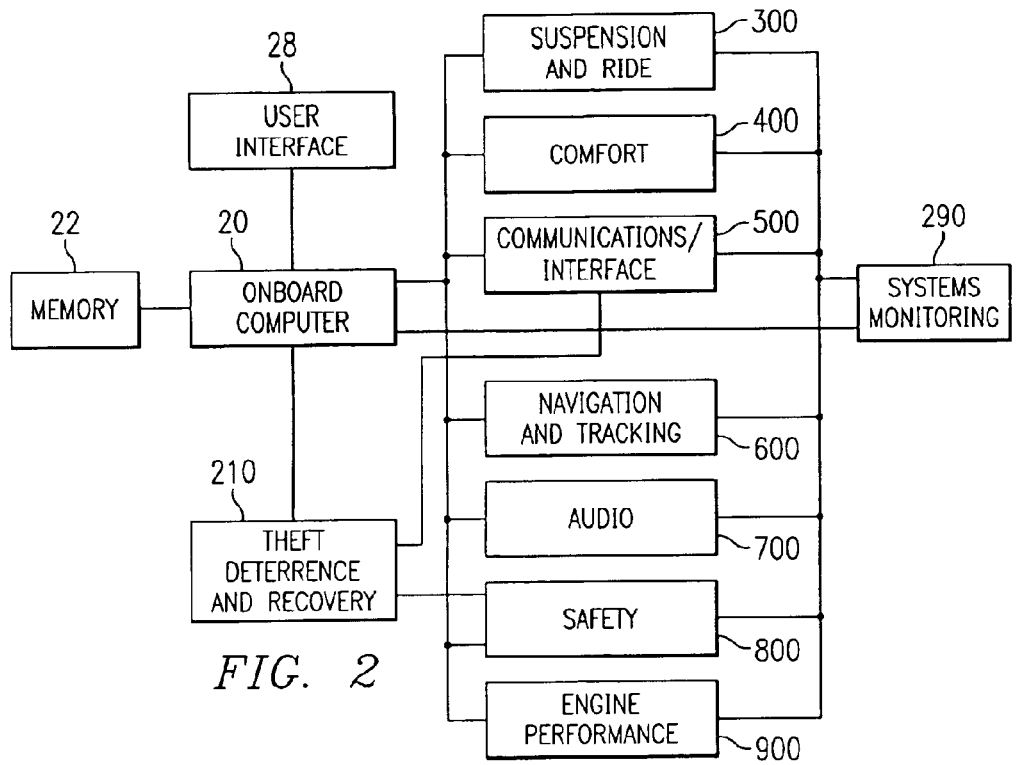
FIG. 2 depicts onboard systems of the present invention as defined in a preferred embodiment of the present invention.

FIG. 2 describes the systems of the present invention as defined in a preferred embodiment of the present invention. In the present invention, the vehicle may contain one or more Onboard Computer(s) 20. Users control different systems within the vehicle through Onboard Computer 20. A specific user can only gain as much control of a system or subsystem as authorized by Onboard Computer 20. A user may fall into one or more security level(s), for instance, low level security, master level security, administrator, service attendant, parking attendant or semi-user. The varying levels of security allow users having different access priorities to access only the systems authorized by the level of security that corresponds to the user's security level. Other, more specialized security levels might also be available for special purpose operation of the vehicle, such as thief and drunk driver levels which severely limit access and performance of the vehicle.

Implementing the different security levels is primarily a software function which authorizes security levels in a series of IF tests in a logic flow. This software function is an extremely effective means of implementing security levels because the preferred embodiment consists of a closed system which is protected from arbitrary software being installed from unknown sources. Alternatively, each security level could be a separate level of hardware. Onboard Computer 20 also contains an onboard computer Memory 22 which would store the software logic described above. Onboard Computer system 20 is intended to be exemplary in nature, and it is not intended in any way to restrict the implementation of this invention.

In one embodiment of this invention, Onboard Computer 20 controls several onboard systems through its different security levels. For simplicity, the invention is described largely as consisting of two security levels, low and high, corresponding to two different levels of user security. One feature of this invention is that accessing and changing preferences relating to any one of these systems can be done only by the user who has a corresponding security level for the security level which controls the specific system.

Taking first the lower level security, a low level security user may access and change preference settings for one or more of the following onboard systems: Suspension and Ride system 300; Comfort system 400; Communications/Interface system 500; Navigation and Tracking system 600; Audio system 700; and Systems Monitoring system 290 for the above-mentioned onboard systems.

A user possessing a higher security level, such as a master security level as authorized by Onboard Computer 20, in addition to resetting and adjusting the preference settings for the systems requiring a lower level security level for access, may also adjust the preference settings of the systems requiring a higher level of security for authorization. Higher level security authorization is required for: Safety system

800; Engine Performance system 900; and Theft Deterrence and Recovery system 210.

Figure 3:
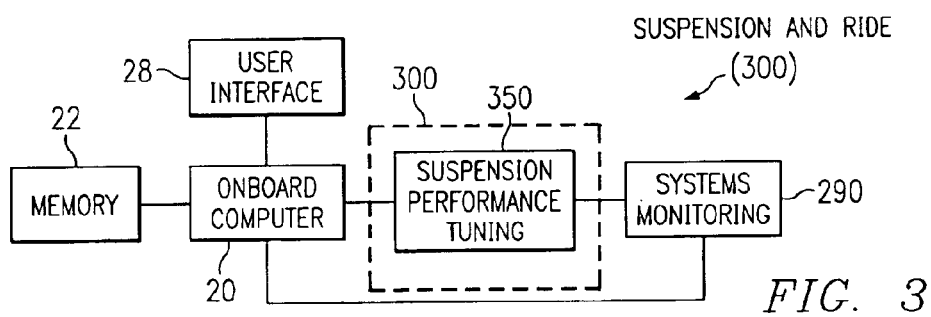
FIG. 3 illustrates the suspension and ride system of the vehicle.

FIG. 3 depicts the suspension and ride system of the vehicle. The dashed line around the subsystems depicts which functions are controlled by the system. Suspension and Ride system 300 and associated subsystems are controlled by preferences which set functions associated with the particular subsystems. Suspension and Ride system 300 includes Suspension Performance Tuning 350. By the user specifying suspension performance tuning parameters, the vehicle's ride attributes, such as pitch, yaw, roll and stiffness, can be changed.

As the user is identified through the use of a user ID via User Interface 28, Onboard Computer 20 extracts certain performance settings from onboard Memory 22 which are indexed to the user's name or ID number. These performance settings include user specific parameters which are used to modify each of the functions described above. One example is that a user may prefer a stiffer ride and may prefer a certain feel when he operates the vehicle. Therefore, the user may select certain parameters having to do with suspension performance tuning to affect the vehicle's ride. These parameters adjust each one of the functions mentioned above associated with the subsystem in order to give that user the ride which he desires.

Systems Monitoring 290 continually monitors pitch, yaw, roll and stiffness attributes of the vehicle's ride and transmits the information to Onboard Computer system 20. In another embodiment of this invention, Systems Monitoring system 290 continually updates the suspension performance tuning in order to maintain that overall riding effect desired by the user. Therefore, as suspension and ride parts such as tires, shocks, struts, springs and bearings wear, Systems Monitoring system 290 monitors each one of the functions for the desired effect. If the results monitored by Systems Monitoring system 210 are not within the user's set preference, Onboard Computer system 20 may attempt to adjust each one of the functions automatically in an attempt to adjust the ride to the user's desired preferences—in other words, reset the user specified ride parameters automatically.

In another embodiment, the user merely sets parameters associated with suspension performance tuning, and Systems Monitoring system 290 merely monitors the functions and transfers the functional output to Onboard Computer 20. In this embodiment, it is left up to the user to manually set each one of the ride and suspension parameters, and as the parts of the vehicle change with respect to wear or damage, the user is expected to manually update each one of the parameters. Although this is possible, it is unlikely that the ordinary user would possess the skill necessary to make those adjustments autonomously, thus requiring Onboard Computer 20 to calculate those functional parameters for the user. Therefore, while expert drivers such as race car drivers, mechanics and the like may possess the knowledge needed to adjust these parameters, the ordinary weekend vehicle operator might rely on a routine stored within Onboard Computer 20 to make those adjustments.

Figure 4:
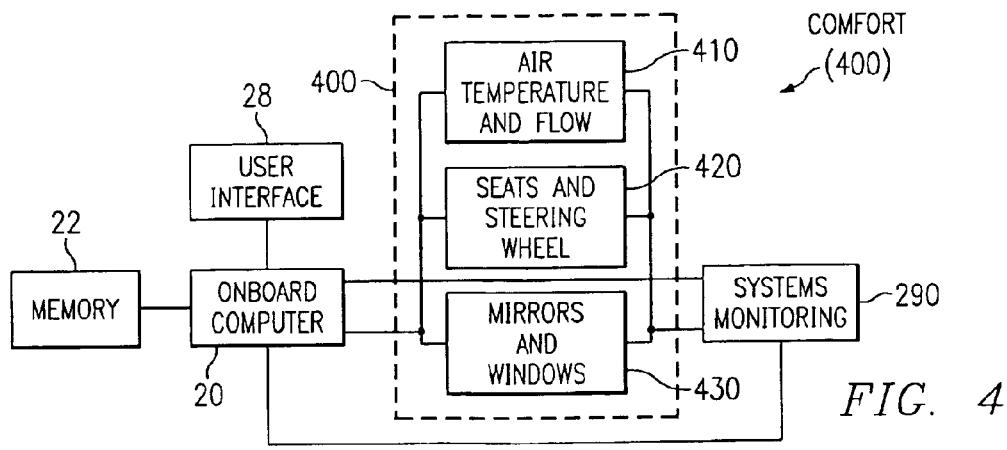
FIG. 4 illustrates the comfort system of the vehicle.

FIG. 4 illustrates another system under the control of every user, the Comfort system 400. Comfort system 400 includes: Air Temperature and Flow subsystem 410; Seats and Steering Wheel subsystem 420; and Mirrors and Windows subsystem 430. Once the user has been identified by Onboard Computer 20 via User Interface 28, Onboard Computer 20 retrieves user specific parameters from system Memory 22. Those user specific parameters are used to adjust the various subsystems of Comfort system 400. If a user enjoys the air temperature somewhat lower and the flow higher than other users, as the user is identified by Onboard Computer 20, Air Temperature and Flow subsystem 410 are automatically adjusted to the user specific parameters stored in Memory 22. Therefore, the user would not have to readjust the air temperature and flow parameters every time the user enters the car, but rather merely satisfy identification to Onboard Computer 20, and Onboard Computer 20 would retrieve the user's specific user parameters from Memory 22 and adjust Comfort system 400 accordingly.

In the depicted example, other conveniences controlled by Comfort system 400 include adjusting seats and steering wheel positions, and mirrors and windows for particular users. As the user's height and proportions tend to change from user to user, it would be advantageous for each user to preset such settings as the seat position setting and the steering wheel position, along with mirror positions and window positions for the individual user. As the user drives the vehicle, and climate conditions or tastes change, the user may have occasion to adjust certain of the above-mentioned subsystems. As the user adjusts the subsystems, Systems Monitoring system 290 notes these adjustments and transmits the adjustments to Onboard Computer 20. Onboard Computer 20 then may store the adjustments to system Memory 22. On exiting the vehicle, the user need not reset the various user parameters that were initially stored in Memory 22, as these have been updated while the user operated the vehicle.

In one embodiment, Onboard Computer 20 merely retains the updated user specific parameters within Memory 22 as the user exits the vehicle, retrieving them again as the user specific parameters when the user is again identified to Onboard Computer 20. In another embodiment, updates fed to Onboard Computer 20 via Systems Monitoring system 290 are merely transient. In that embodiment, the updates are lost once the user exits the vehicle unless the user takes some affirmative action to save them. In that embodiment, once the user exits the vehicle the updated parameters are lost in lieu of the initial user specific parameters.

Figure 5:
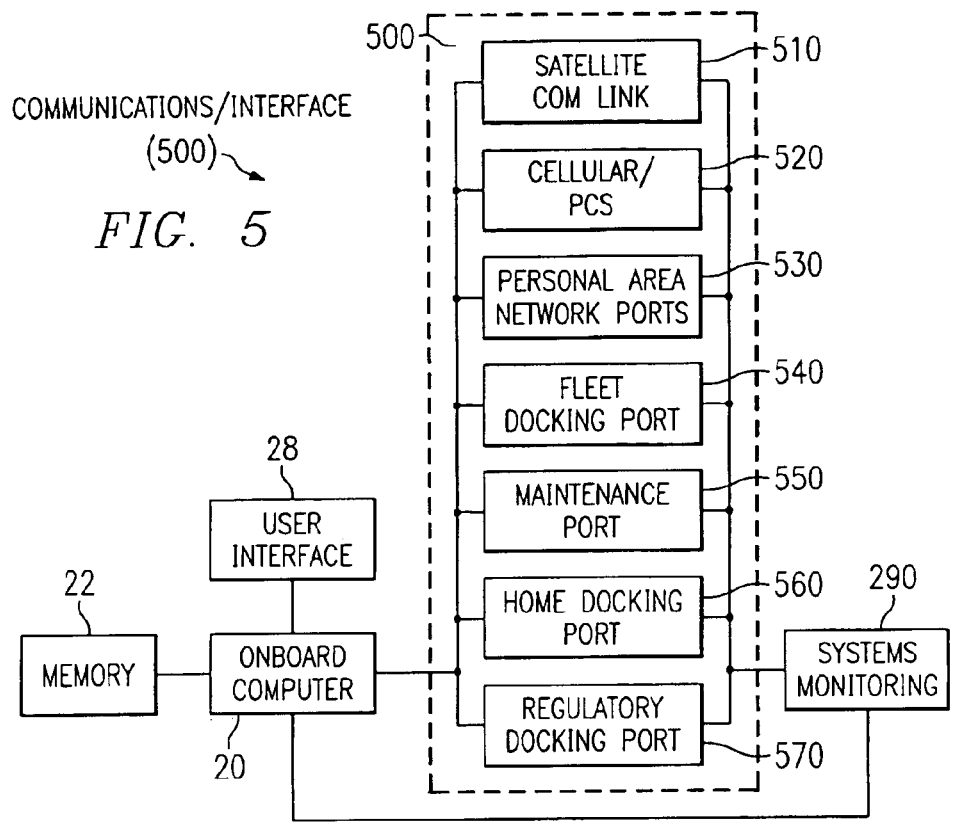
FIG. 5 illustrates another system under the control of the onboard computer, the communications/interface system.

FIG. 5 illustrates another system under the control of the onboard computer, the communications and interface system. Another system that may be under the control of lower level security users is Communications/Interface 500. In a fully integrated onboard computer system, the ability to access large amounts of data for the convenience and safety of the operator becomes more and more important. Also, as the complexity of vehicles increases, the maintenance of those vehicles is expedited by allowing access to Onboard Computer 20 and the various systems through a specialized maintenance interface.

One embodiment of the present invention, Communications/Interface system 500, consists of various subsystems as fulfill the various above-mentioned needs. These include: Satellite Com Link 510; Cellular/PCS communications 520; Personal Area Network Port 530; Fleet Docking Port 540; Maintenance Port 550; Home Docking Port 560; and Regulatory Docking Port 570. Depending upon the intended use of the vehicle, some or all of these communications subsystems may be eliminated or substituted with other types of communications subsystems.

Other subsystems, such as Satellite Com Link 510 and Cellular/PCS communications 520 may contain extensive local memories for holding user specific data like earth link addresses and telephone numbers. Alternatively, earth link addresses and telephone numbers may be stored on a personal memory such as a SmartCard or magnetic swipe card, or in system Memory 22, and indexed by user.

In one example of the communications subsystems, for instance a fleet vehicle operation, vehicles could be continually tracked via Satellite Com Link 510. The fleet dispatcher, therefore, could watch the progress of vehicles and goods from the origin to the destination. If the dispatcher detects a delay somewhere along the route, the dispatcher could immediately contact the vehicle through Cellular/PCS 520 link or Satellite Com Link 510 to ascertain the problem and try to help the vehicle operator formulate an alternate route.

Personal Area Network (PAN) Port 530 would be useful for such things as ascertaining if a vehicle is authorized to, for instance, go through a toll booth. There, Onboard Computer 20 would automatically link with a computer at the toll booth via Personal Area Network Port 530 and communicate to the toll booth computer an electronic cash account number by which the toll computer could access and debit the cash amount of the toll, thereby eliminating the need for the driver of the vehicle to stop the vehicle and pay a toll. This would also eliminate the need for the driver to carry any cash while en route; and in fact, the vehicle itself may not even need to have the cash account, as it could merely link to the home or fleet headquarters and debit a financial account for the cash.

Another interface particularly helpful in fleet operation is a Fleet Docking Port 540. Although in the preferred embodiment, Fleet Docking Port 540 is a specific hardware port, fleet docking may also be realized by using the wireless network circuit described above in reference to FIG. 1. Fleet Docking Port 540 would be useful for an operation that tracks several vehicles up to several thousand vehicles. As the vehicle would enter the home terminal, the vehicle could park for transfer of cargo or maintenance, or whatever, and then be linked via Fleet Docking Port 540 to the terminal computer which in turn would be linked to the main operational computer. Thus, as the truck receives maintenance, or on or off loads cargo, the information concerning the prior trip could be downloaded from Onboard Computer 20 Memory 22, and information pertaining to the next scheduled trip, including maps, itinerary, electronic cash and the like, could be loaded onto Onboard Computer 20 Memory 22. Vehicle operators could also be authorized and de-authorized for the vehicle.

As noted above, detailed maintenance records are also important, especially as the number of vehicles in a fleet operation increases. Therefore, a specific Maintenance Port 550 would be useful. Maintenance Port 550 would provide instant access to certain files or records and allow for testing of onboard systems simultaneously with other fleet interface operations. While Maintenance Port 550 indicates that, primarily, the access is limited to maintenance of the engine and onboard systems and subsystems, Maintenance Port 550 should also have access to Onboard Computer 20 main Memory 22 to ascertain such things as fuel and mileage logs, distances traveled, environments traveled in and the like. In this way, an expert mechanic could determine the overall maintenance condition of the unit by comparing it to its previous performance.

Home Docking Port 560 would also be useful in a fleet operation where the vehicle operator may be required to bring the vehicle home. In that case, the vehicle operator would merely dock the vehicle at the home port and, using the user's home computer, the fleet operations could interface with the computer, for instance while the operator was away or asleep or on another task. In this way, Memory 22 in Onboard Computer 20 could be uploaded with pertinent information about an upcoming trip.

Figures 6, 14, 15:
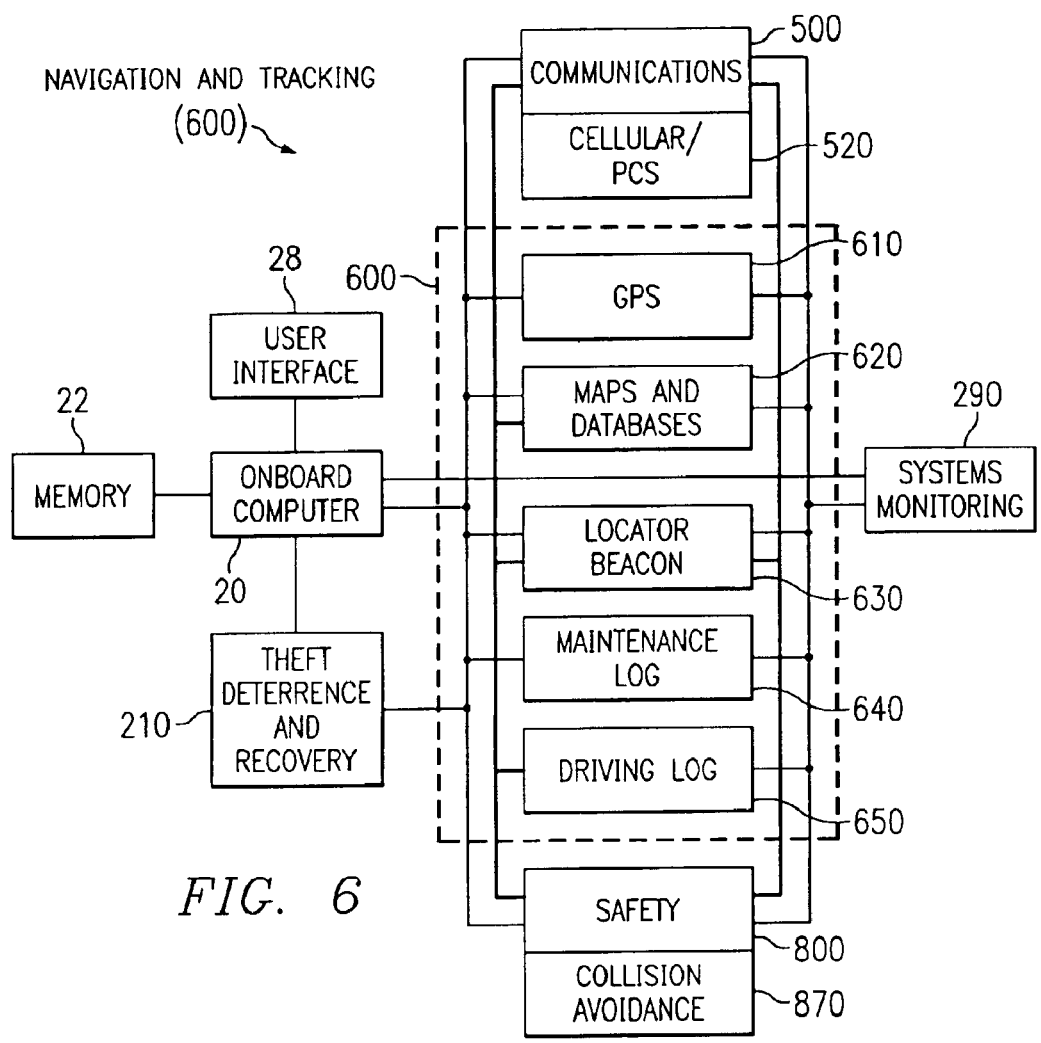
FIG. 6 illustrates another system under the control of the onboard computer, the navigation and tracking system.
FIG. 14 illustrate the data structure stored in memory of the present invention.
FIG. 15 illustrates the user ID data structure.

FIG. 6 illustrates another system under the control of the onboard computer, the navigation and tracking system. Another important onboard system is Navigation and Tracking system 600. A typical Navigation and Tracking system 600 may include GPS 610 for ascertaining the exact vehicle position via geosynchronous positioned satellites. Maps and Databases 620 would probably reside in the system Memory 22. Maps and Databases 620 might also be fairly transient, being uploaded and downloaded as the intended route of the vehicle changes. In another aspect of the invention, Maps and Databases 620 may be downloaded via Satellite Com Link 510 or Cellular/PCS 520 connection to the vehicle's home terminal.

Navigation and Tracking system 600 may also include Locator Beacon 630. While Locator Beacon 630 could take many forms and work in cooperation with one of the communication systems, either Satellite Com Link 510 or Cellular/PCS 520, Locator Beacon 630 may be a separate subsystem providing a radio frequency beacon used to locate the vehicle in case of emergency or possibly to track vehicle movements within a local area for a fleet dispatcher.

Another important set of tracking databases might be Maintenance Log 640 and Driving Log 650, which are somewhat related. For an expert mechanic to properly maintain a vehicle, it is useful to have within the vehicle's Maintenance Log 640 the prior routes and conditions in which that vehicle was driven. In that way, when the vehicle experiences what appears to be a sudden loss in performance over the last few trips, a master mechanic can examine the log to note if any difference in the driving pattern exists. Along that same vein, Driving Log 650 could also be useful to a master mechanic in examining the actual driving performance of the vehicle driver. Therefore, by carefully examining these two logs, a master mechanic might merely conclude that what appears to be poor vehicle and engine performance can merely be attributed to the change in drivers, driving patterns or routes.

Figures 19, 20:
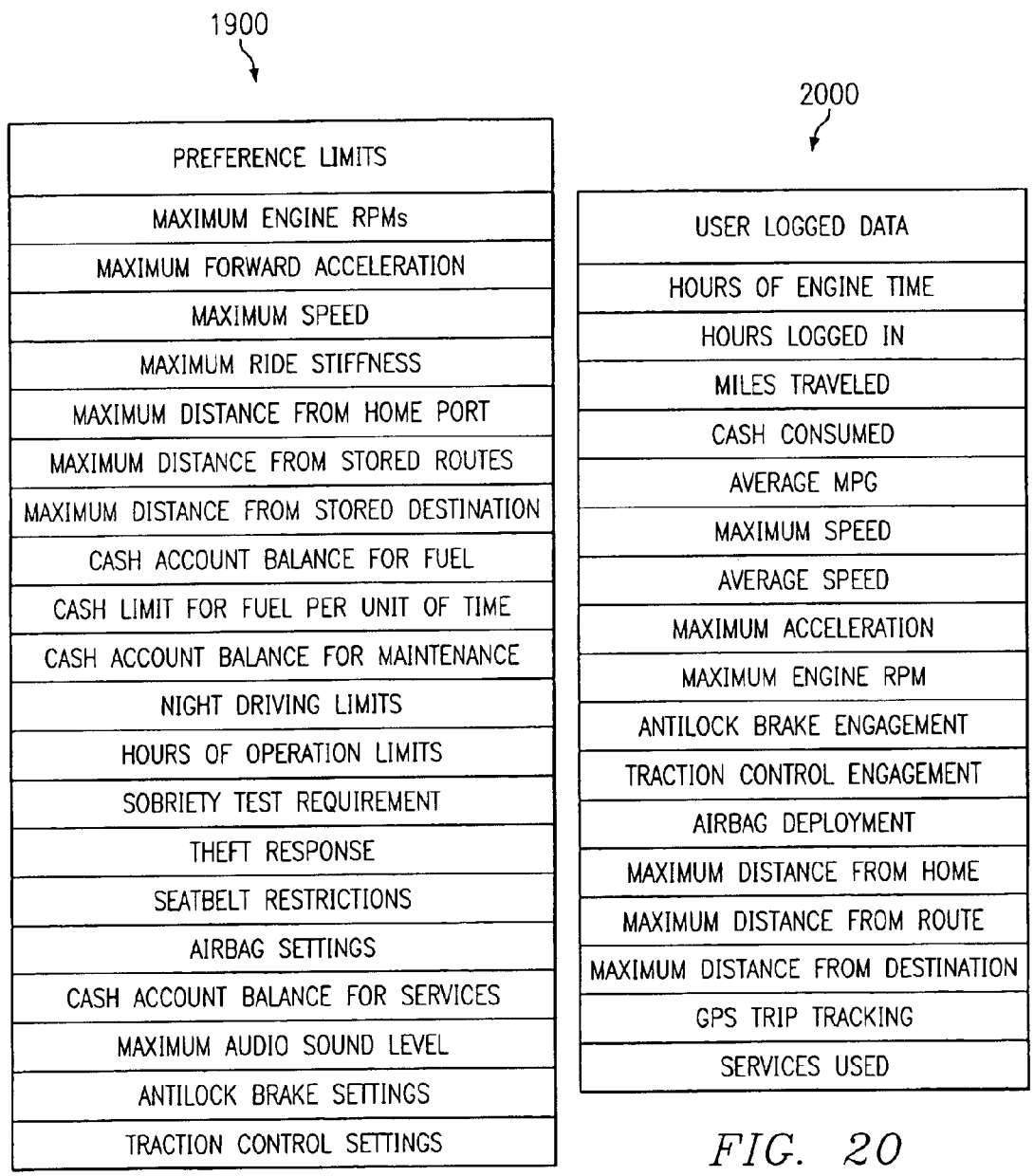
FIG. 19 illustrates the preference limits data structure.
FIG. 20 illustrates the data structure of user logged data.
Figure 21:
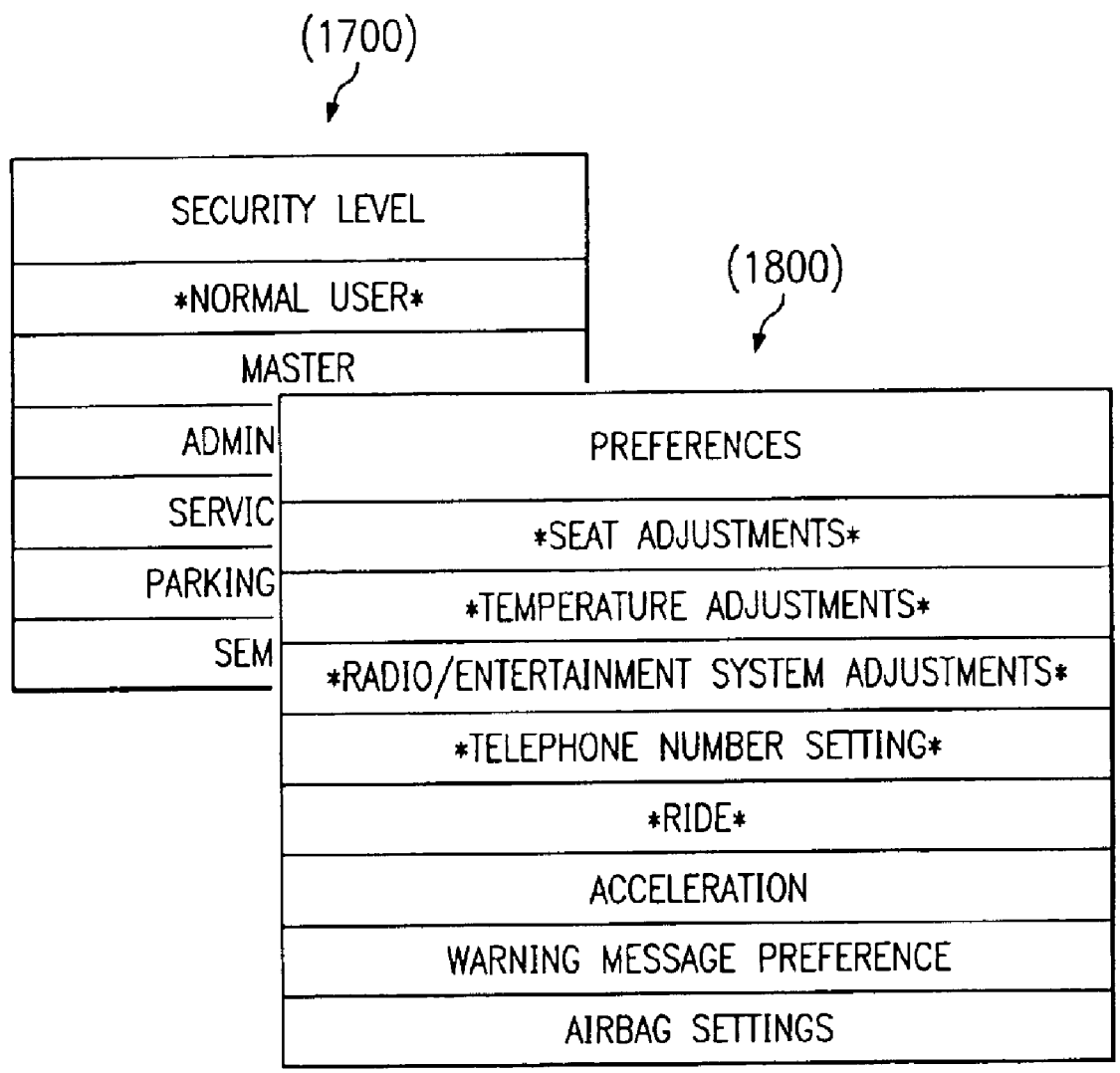
FIG. 21 illustrates an example of how the onboard computer authorizes user preferences by user security level.

Additionally, Driving Log 640 and Maintenance Log 650 can be used together to assemble data in User Logged Data 2000, FIG. 20. User logged data is indexed by user and might contain fields such as the operation of the vehicle, a specific trip and other data. The log could be displayed on User Interface 28 or at the user's home terminal by a user having an administrator security level. User Logged Data 2000 is an extremely useful resource for setting preference limits as shown on data structure 1900, FIG. 19.

With User Logged Data 2000, the performance of each user under a specific security level can be monitored by analyzing User Logged Data 2000, and specific preferences can be set for that user. For instance, if a user appears to be prone to extremely fast accelerations, an administrator examining the Maximum Acceleration field of User Logged Data 2000, may limit that user. The administrator can limit vehicle acceleration to a more moderate rate by changing 5 feet per second$^2$ to 3.5 feet per second$^2$ in the Maximum Forward Acceleration field of Performance Limits data structure 1900.

Working in close association with Navigation and Tracking system 600 would be Communications/Interface system 500 and especially Cellular/PCS subsystem 520. Additionally, Theft Deterrence and Recovery system 210 and Collision Avoidance subsystem 870 of Safety system 800 could also make extensive use of Navigation and Tracking system 600.

In one example, if a vehicle is identified as being stolen or being used in an unauthorized manner, the vehicle can automatically ascertain its position via use of GPS subsystem 610 and Maps and Databases subsystem 620. Onboard Computer 20 could then use Communications/Interface system 500 to transmit the information through either Cellular/PCS subsystem 520 or Satellite Com Link subsystem 510 to the fleet dispatcher or local authorities. Additionally, once it has been positively confirmed that the vehicle has been stolen, Locator Beacon 630 could be turned on to aid the police in determining the location of the vehicle.

Another important feature of this invention, Safety system 800, including Collision Avoidance subsystem 870, would make extensive use of Maps and Databases 620 and GPS 610 subsystems in the event of an accident. For instance, Collision Avoidance subsystem 870 might, through some combination of events, detect that an accident that is likely to cause injury or death is imminent. In that case, rather than waiting for the accident to actually occur, Onboard Computer 20, using one of Communications/Interface 500 subsystems, either Cellular/PCS 520 or Satellite Com Link 510, can place an emergency call to the fleet dispatcher, to the vehicle's home or possibly to the local authorities, such as a 911 emergency call. In that way, once the accident actually occurs and the vehicle becomes inoperable, including Onboard Computer 20, a distress signal has already been issued by Onboard Computer 20. If, on the other hand, the accident which was determined by Onboard Computer 20 to be imminent does not occur, or the severity of the accident is limited, the user may merely cancel the imminent distress call.

Of course, under ordinary use, vehicles tend to break down or have mechanical difficulties of one type or another; and somehow, the likelihood is that, when that occurs, the vehicle operator will not have a clear idea of the vehicle's location within a particular driving area. By using the integrated Navigation and Tracking system 600, the vehicle operator can quickly determine the vehicle's location at the time of the incident and, using Communications/Interface system 500, call either a dispatcher, mechanic or a service company for aide.

In other embodiments, performance limits may be adjusted to limit the maximum distance a vehicle is authorized to travel from its home base or in deviation from a predetermined route of travel. Working in combination with Safety system 800 and Engine Performance system 900, Warnings, Gauges and Lights subsystem 830 uses visual or audio indicators to gently remind the vehicle operator that the limits of travel are being exceeded (see FIG. 8). Finally, when the infraction becomes critical, the vehicle is gently caused to come to a stop by reducing the maximum vehicle speed parameter limit which reduces the vehicle's speed using Vehicle Speed subsystem 920, FIG. 9.

However, prudent safety operation dictates that the vehicle should always be allowed to move very short distances, such as one hundred feet, just in case the vehicle operator becomes de-authorized at a point which is unsafe, such as a railroad crossing. This gives the de-authorized operator an extra measure of distance to travel.

Finally, a user may be restricted from operating the vehicle further than a certain number of miles from its home to reduce unauthorized trips and joy riding. A regular route vehicle may be limited to a prescribed route of travel and any variation might be strictly prohibited. However, in most instances the parameters are not so strict as to allow the vehicle to be maneuvered around detours.

Figure 7:
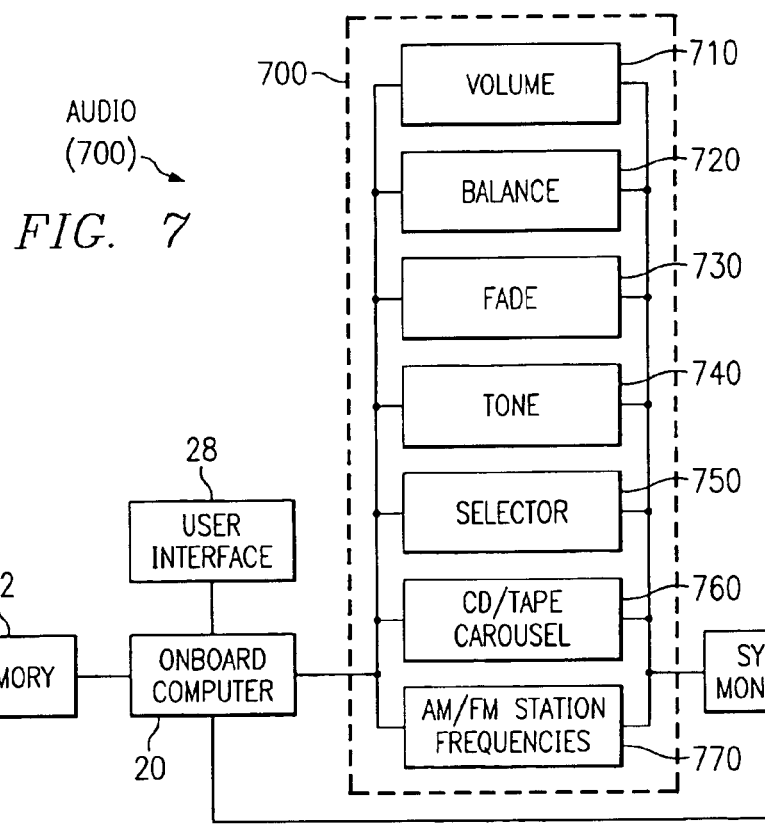
FIG. 7 illustrates another system under the control of the onboard computer, the audio system.

FIG. 7 illustrates another system under the control of the onboard computer, the audio system. Another onboard system which would be particularly convenient for multiple vehicle users would be Audio system 700. Audio system 700 connects to Onboard Computer 20, which restricts access to users who do not possess the required security level. Users such as parking attendants and the like who may be required to operate the vehicle only for short distances, are not expected to use the vehicle's audio system. Audio system 700 would allow each operator to select preferred AM/FM radio stations, compact disks or tape selections for listening. In addition, it would allow the individual users to select unique preferences for volume levels, tone and other audio quality settings. Audio system 700 contains: Volume subsystem 710 for adjusting the volume of Audio system 700; Balance subsystem 720 for adjusting the balance between left and right outputs of Audio system 700; Fade subsystem 730 for adjusting front and rear outputs of Audio system 700; and Tone subsystem 740 or comparable subsystem for adjusting the frequency response or spectral response of the outputted sound. Audio system 700 may also include Selector 750, which selects the user specific devices such as CD, tape, AM/FM radio or other possible outputs. Audio system 700 may also contain CD/Tape Carousel 760, which stores a variety of CDs or tapes on a ready-to-use basis, allowing the user to merely select from an available selection in CD/Tape Carousel 760 rather than having to reload CDs or tapes. Finally, Audio system 700 could include AM/FM Station Frequencies subsystem 770, which includes the user's preferred station settings, along with possible station types and a menu of stations in the vehicle's area.

Audio system 700 works in a fashion similar to the other systems in that the user is identified to Onboard Computer 20 via User Interface 28. Once the computer recognizes the user, the computer then accesses audio preferences which can be stored in computer Memory 22. Those preferences are then transmitted to Audio system 700.

Pre-stored user specific preference settings for volume, balance, fade and tone of the outputted audio adjust the various subsystems such as Volume subsystem 710, Balance subsystem 720, Fade subsystem 730 and Tone subsystem 740. In addition, user-defined preferences stored in Memory 22 would determine which output device the user has chosen to listen to and transmit that information to Selector 750, which then activates the appropriate device, either radio or CD or tape. Once that device is activated, it in turn accesses the tape and selection or CD and selection from the CD/Tape Carousel subsystem 760 or the AM/FM Station Frequencies subsystem 770 and plays the appropriate selection which the user has predefined and stored in Memory 22.

In addition, as the user operates the vehicle, Systems Monitoring system 290 continually monitors manual adjustments by the user to each one of these subsystems. Those adjustments can be used to update the user preferences in the onboard system Memory 22. When the user exits the vehicle, these preferences may be used to replace the previous user specific preferences stored in Memory 22 or may merely be decimated in favor of the pre-stored user specific preferences in Memory 22.

Figure 8:
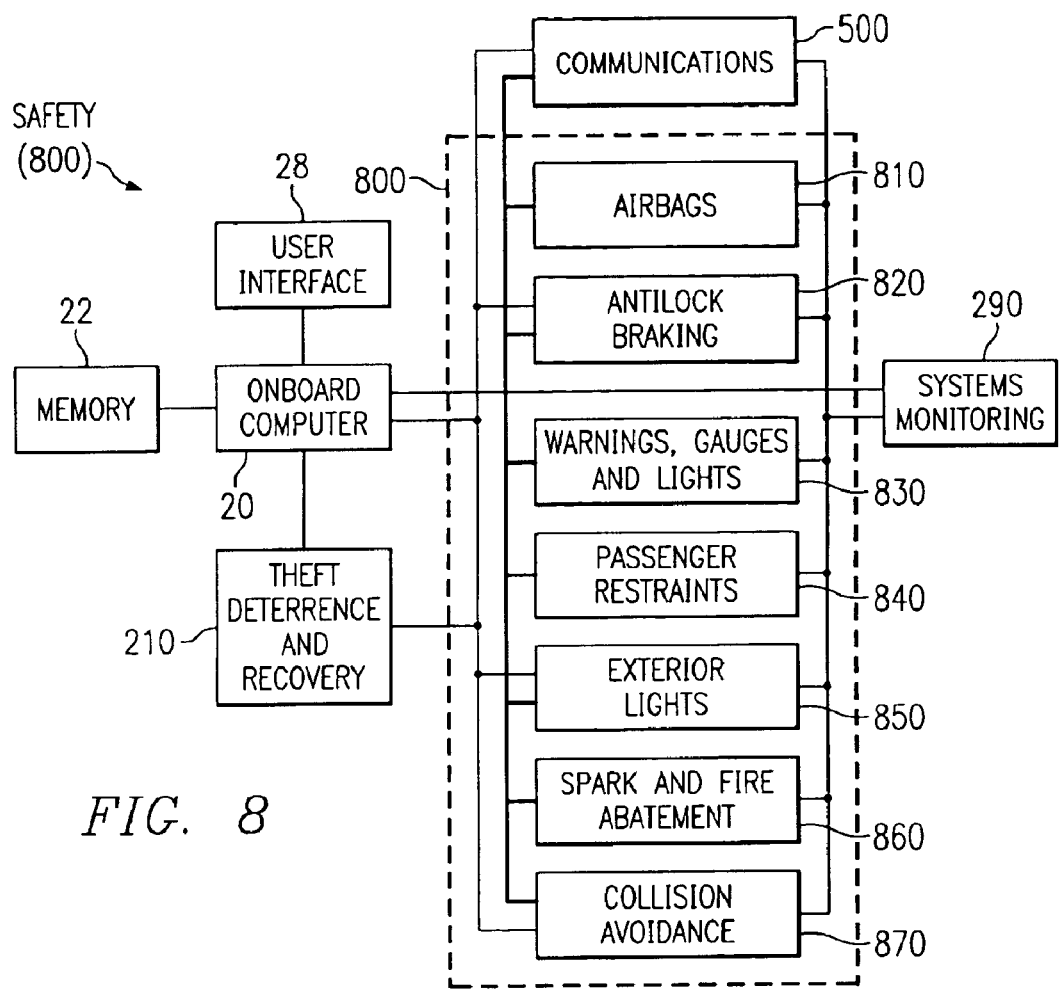
FIG. 8 illustrates the safety system as implemented in the present invention.
Figure 16:
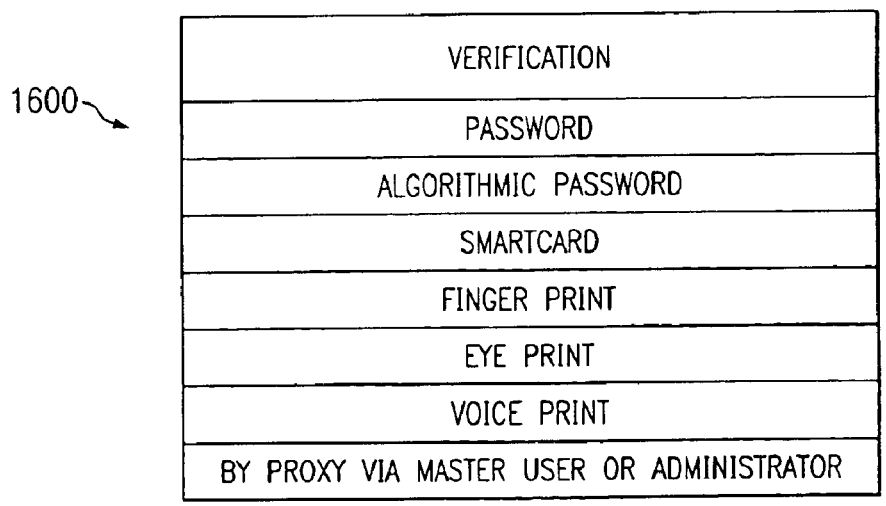
FIG. 16 illustrates the verification data structure.

FIG. 8 illustrates Safety system 800 as implemented in the present invention. Safety system 800 is contained within the dashed lines of FIG. 8. Safety system 800 of the present invention is authorized only for higher security level users than the systems discussed thus far. Therefore, as the user accesses Onboard Computer 20 via User Interface 28, the user ID supplied by the user is ascertained by Onboard Computer 20. The user ID is then compared to a list of IDs to ascertain the level of security that is authorized for the user associated with this particular ID. Again, as in the other systems described above, Onboard Computer 20 would then authorize the user's ID number and retrieve user specific parameters from system Memory 22. The user is granted access to Safety system 800 only if the user is authorized for a higher level of security than the normal user. Therefore, Onboard Computer 20 will only grant control of Safety system 800 to users possessing a master or higher level of security authorization. The user specific parameters would be accessed and applied to the various subsystems within Safety system 800. Safety system 800 contains various subsystems which relate to the safety of the vehicle. Those subsystems include: Airbags 810; Antilock Braking 820; Warnings, Gauges and Lights 830; Passenger Restraints 840; Exterior Lights 850; Spark and Fire Abatement 860; and Collision Avoidance subsystem 870.

In one embodiment, Airbags 810, may be either enabled or disabled depending upon the user's preferences or safety needs. For instance, in normal user mode all of the airbags in the car would be active. However, certain users with access to the necessary security level may disable certain airbags via Airbags subsystem 810. In cases where a parent always drives with a young child in a car seat, the airbags adjacent to the car seat might be disabled by setting the appropriate user specific preferences. Alternatively, the user or certain passengers might be of such slight stature that deployment of the airbags may be more hazardous than the accident itself, especially in a low-speed accident. In that case, that user may prefer to disable one or more of the airbags in the passenger compartment via Airbags subsystem 810.

Other preferences might disable antilock braking for certain users via Antilock Braking subsystem 820. Also, Warnings, Gauges and Lights subsystem 830 may have preferences as far as warning defaults and the like, to be set depending on the user's preferences. These may consist of configuring graphic displays to setting warnings messages as either visual, text, voice or audio warnings. Passenger Restraints subsystem 840 might be set to require all passengers to be fully restrained before the vehicle will move. One method of implementing this requirement totally within Safety system 800 would be for vehicle Antilock Braking subsystem 820 to engage the brakes, thereby prohibiting the vehicle from moving until all passengers are fully restrained.

Other subsystems include Exterior Lights subsystem 850, which monitors and controls the exterior lights. Therefore, when an exterior light burns out or is damaged, Systems Monitoring system 290 immediately communicates the status to Onboard Computer 20, and the information is conveyed to the user via User Interface 28 or through Warnings, Gauges and Lights subsystem 830. Another subsystem important to safety is Spark and Fire Abatement subsystem 860. While most terrestrial vehicles possess only minimal spark and fire subsystems, aircraft and marine vehicles require more sophisticated spark and fire abatement subsystems because of the lack of alternatives to operators of non-terrestrial vehicles.

Another subsystem important to the safety of operation is Collision Avoidance subsystem 870. Because collision avoidance is one of the most rapidly changing safety items on a vehicle today, even more advancement in the area of collision avoidance is expected in the future. A collision avoidance subsystem may be further partitioned into front and rear subsystems or even into xyz direction subsystems for vehicles that do not travel along a plane. In one embodiment, Collision Avoidance subsystem 870 is linked inexorably to Antilock Braking subsystem 820, Passenger Restraints subsystem 840 and Airbags subsystem 810. In addition, Collision Avoidance subsystem 870 is connected to Communications/Interface system 500. Collision Avoidance subsystem 870 will continually monitor the vehicle's position with respect to the positions of all other vehicles and obstacles in the proximity of the vehicle. Once the possibility of a collision is detected by Collision Avoidance subsystem 870, Collision Avoidance subsystem 870 attempts to warn the operator through Warnings, Gauges and Lights subsystem 830 using audible and visible alerts intended to make the operator aware that a collision involving this vehicle is likely.

At some point before an imminent collision, Collision Avoidance subsystem 870 may act autonomously to avoid the collision. For instance, Collision Avoidance subsystem 870 may set the antilock brakes via Antilock Braking subsystem 820. Collision Avoidance subsystem 870 may also communicate to the local authorities via Communications/Interface system 500 that a collision involving the vehicle is likely or imminent. Collision Avoidance subsystem 870 may also allow airbags to deploy faster by using Airbags subsystem 810 in combination with Collision Avoidance subsystem 870. Then, rather-than relying on the airbags to deploy in response to impact sensors along the bumpers and sides of the vehicle, the user modifies the user specific parameters associated with Collision Avoidance subsystem 870 to deploy the airbags when the vehicle reaches a threshold proximity to the obstruction. Therefore, rather than the airbag being triggered by a certain amount of front or rear-end deformation of the vehicle, the airbag deployment is triggered just before the vehicle impacts with the obstruction, thereby saving valuable milliseconds in deployment. Also, changing the user specific parameters to deploy airbags sooner allows for lower speeds of acceleration within the airbags, which has been determined to be advantageous to smaller and lighter users and passengers.

Another embodiment of the present invention, Theft Deterrence and Recovery subsystem 210, might be connected with both Antilock Braking subsystem 820 and Exterior Lights subsystem 850. This combination would allow Theft Deterrence and Recovery subsystem 210 to activate certain exterior lighting configurations and/or antilock brakes at certain times during a vehicle theft. In one example, the user may pre-set certain user specific parameters that would allow a vehicle theft to occur only in certain places. For instance, it might be that the user would allow the vehicle to be stolen from the user's home but not the user's place of business. This is an important safety consideration, being that there is a likelihood of violence occurring during a frustrated theft attempt. Therefore, in attempt to avoid frustrating a potential vehicle thief at the user's home, the user may elect to allow the vehicle to be stolen and then alert the local authorities via Communications/Interface system 500. In addition, Theft Deterrence and Recovery system 210 could reconfigure certain exterior lights that are not visible to the present unauthorized operator. For instance, a vehicle that is being operated by an unauthorized user might be configured to flash one exterior brake light each time the brake pedal is pressed. Therefore, authorities witnessing a flashing rear brake light might have reasonable suspicion to stop such a vehicle and inspect it. In another embodiment, the Antilock Braking subsystem 820 may be set to trigger the brakes upon the unauthorized user traveling one or two miles from the user's home. In that case, the vehicle would become completely inoperable and the unauthorized user would hopefully abandon the vehicle. Thus, the vehicle would be available for safe recovery.

Figures 9, 17, 18:
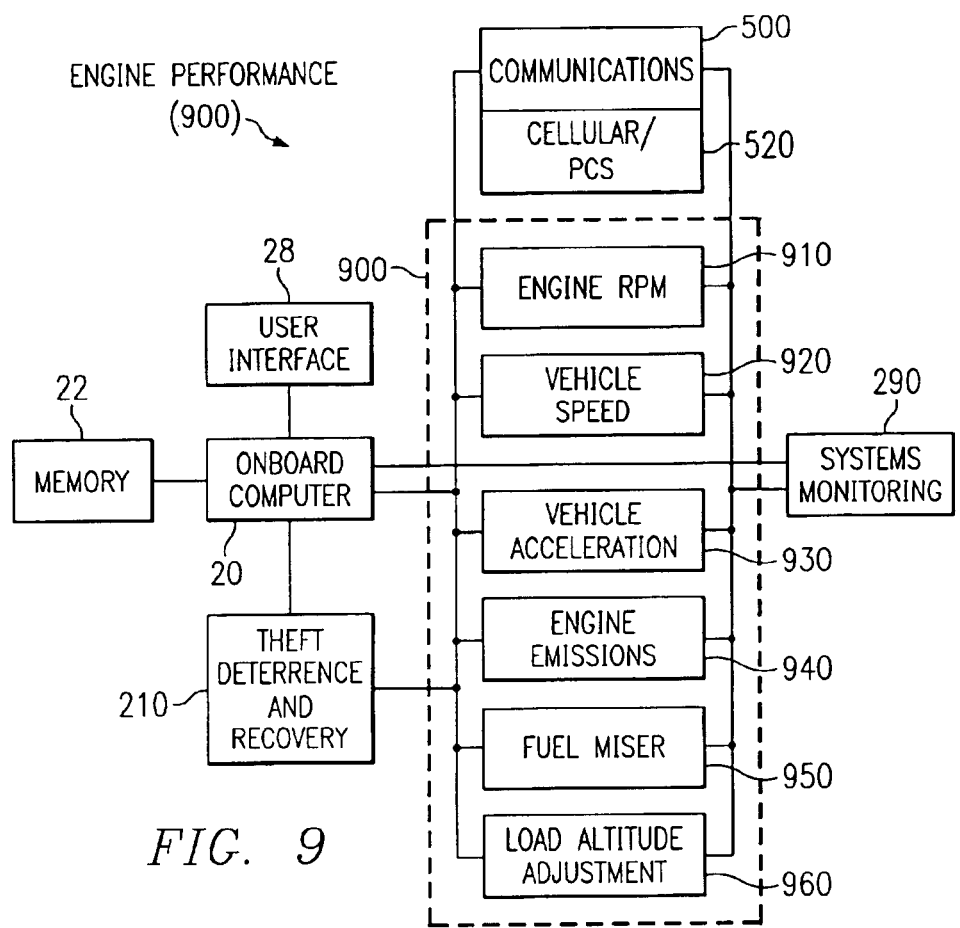
FIG. 9 illustrates the engine performance system as related to the present invention.
FIG. 17 illustrates the security level data structure.
FIG. 18 illustrates an extremely abbreviated data structure of possible preferences.

FIG. 9 illustrates Engine Performance system 900 as related to the present invention. Like Safety system 800, Engine Performance system 900 requires higher level security for authorization by Onboard Computer 20. User preferences are stored in Onboard Computer 20 system Memory 22 just as in the cases described above. Engine Performance system 900 consists of several possible subsystems, including Engine RPM (i.e., revolutions per minute) subsystem 910; Vehicle Speed subsystem 920, Vehicle Acceleration subsystem 930; Engine Emissions subsystem 940; Fuel Miser subsystem 950; and Load/Altitude Adjustment subsystem 960. Once the user is identified to Onboard Computer 20 via User Interface 28, Onboard Computer 20 analyzes the user ID to ascertain the user's security level.

If the user has a sufficiently high security level, as authorized by Onboard Computer 20, then the user may reset the user specific parameters for the engine performance subsystems in Engine Performance system 900. It would be conducive to safe operation of the vehicle for certain users who do not possess the necessary skill, age or expertise to operate the vehicle safely, to be limited by the vehicle's performance. One way to limit the vehicle's performance is by limiting or restricting the engine's RPM via Engine RPM subsystem 910. The engine might only be allowed to rev up to a certain level, say 4000 RPMs. Such a limitation would be advantageous where there is a possibility that a younger user might have the tendency to race an engine at a stoplight or in a garage to extremely high RPM levels which could damage the interior components of the engine. Another important aspect of the present invention is limitation of the vehicle's speed via Vehicle Speed subsystem 920. Invariably, speed is an important factor in both the frequency and severity of on-the-road accidents. By limiting the vehicle's speed for novice users, the number and severity of these accidents can possibly be decreased. This is also an important concept for vehicles other than on-the-road vehicles, such as airplanes and marine vehicles.

Vehicle acceleration is another important component of a vehicle safety program. If vehicle acceleration is limited via Vehicle Acceleration subsystem 930, the user can only accelerate the vehicle at a certain rate. This reduces the likelihood that younger users who enjoy the fast take-off from a red light or stop sign would participate in such activities. In the case of other vehicles, such as aircraft and marine vehicles, vehicle acceleration may also be measured in deceleration. Extremely rapid deceleration in an airplane or boat can cause the vehicle to become unstable. For instance, in an aircraft extremely rapid deceleration may cause the aircraft to flip or go into a spin that is not recoverable because the vehicle's forward momentum has been lost. Extremely rapid deceleration of a boat causes a wake of water to come over the stern of the boat, thus swamping the vehicle. Therefore, extremely rapid deceleration in aircraft or marine vehicles is highly undesirable.

Another subsystem controlled by Engine Performance system 900 is the Engine Emissions subsystem 940. While Engine Emissions subsystem 940 would generally be inaccessible to the vehicle's operators, it might be advantageous to reduce engine emissions even further below the Environmental Protection Agency (EPA) recommended standards. Therefore, on certain days such as smog alert days and the like, engine emissions may be set to an even stricter standard via Engine Emissions subsystem 940. Clearly this would have a detrimental effect on the performance of the vehicle and would not be appreciated by certain users. In a similar manner, Fuel Miser subsystem 950 may be set to require the vehicle's overall performance to maintain a certain vehicle fuel mileage. Although the vehicle operator may be allowed one or two quick accelerations, thereafter the performance of the vehicle would be strictly limited to make up for those accelerations and maintain the overall fuel efficiency of the vehicle.

Finally, Engine Performance system 900 contains Load/Altitude Adjustment subsystem 960. Load/Altitude Adjustment subsystem 960 would change the engine's performance depending upon the altitude of the vehicle and the load the vehicle is carrying. Thus, when the vehicle is heavily loaded, as in the case of a truck pulling a boat, the vehicle performance characteristics would change from being a faster or faster accelerating vehicle to that of being a vehicle that is more adept for towing, especially up hills, boat ramps and the like. This, of course, would be at the expense of other performance characteristics in the subsystem.

As in Safety system 800, Engine Performance system 900 would be inexorably linked to Theft Deterrence and Recovery subsystem 210. Once Theft Deterrence and Recovery subsystem 210 detected an unauthorized user, the engine performance parameters stored in Memory 22 would set Engine Performance system 900 to levels that would make the vehicle inoperable. For instance, Vehicle Speed 920 parameters might be set to limit the vehicle to zero speed, and Engine RPM subsystem 910 might be set to limit the engine to zero RPM. Also, Vehicle Acceleration subsystem 930 could be set to zero. Thus, the vehicle's engine would be rendered inoperable.

The process of the present invention as described with respect to FIGS. 1 to 10, will now be discussed with respect to FIGS. 11 to 13.

Figure 10:
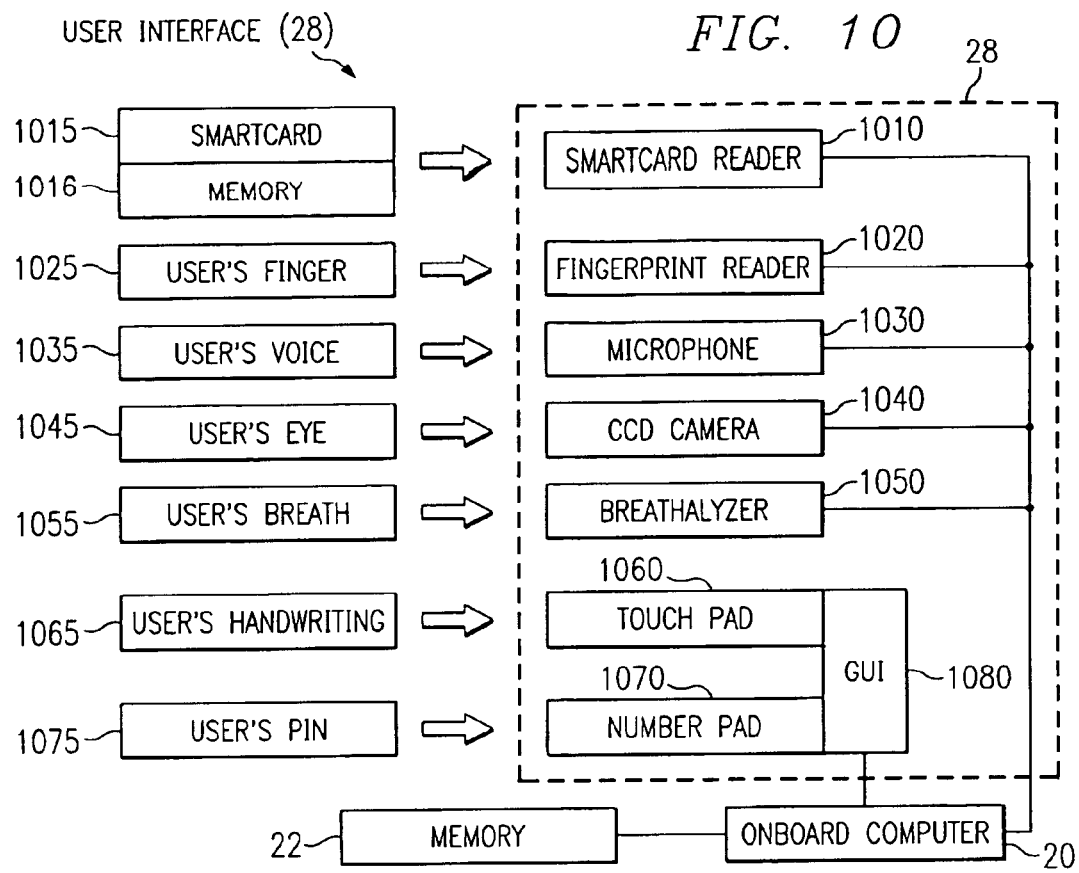
FIG. 10 illustrates the user interface system as implemented in the present invention.

Another important aspect of the present invention is how the user interfaces with Onboard Computer 20. FIG. 10 illustrates the user interface system as implemented in the present invention. User Interface system 28 may employ a variety of different subsystems, singularly or in combination with each other. One of the exciting new concepts to be available involves SmartCard 1015 and SmartCard Reader 1010. SmartCards are well known in the industry and will not be described in detail here; but for the purpose of this invention, SmartCard 1015 contains at least Memory 1016 which is read by SmartCard Reader 1010. When a user enters the vehicle, the user is identified by swiping SmartCard 1015 in SmartCard Reader 1010. Onboard Computer 20 recognizes the input from SmartCard Reader 1010 and accesses Memory 22 for information concerning the user. In one embodiment, Onboard Computer 20 merely checks the data available from Memory 1016 on SmartCard 1015 with the data for the particular user stored in onboard system Memory 22. In other embodiments, Onboard Computer 20 works in concert with a processor (not shown) on SmartCard 1015 in a series of ID verification steps designed to authorize the user.

Another advantage of SmartCard 1015 is that SmartCard Memory 1016 may contain other than merely numeric data. Memory 1016 may include all data pertaining to the owner of the SmartCard, including all user specific preferences applied in setting the various functions and sub-functions of the vehicle. Memory 1016 might also include user identification data such as the user's fingerprint pattern, the user's voice print pattern, the user's iris print pattern or the user's handwriting pattern. In one example, the card could actually initiate the authorization process via Onboard Computer 20. The user would then be required to confirm identity on a second user interface, such as Fingerprint Reader 1020.

Importantly, SmartCart Memory 1016 can be used to store user specific parameters for one vehicle or for several vehicles. In that same way, Memory 22 may store the user specific parameters for all users authorized to operate the vehicle.

System fraud and vehicle theft could be greatly reduced if the intended user who has authorized SmartCard 1015 could also be confirmed as the actual operator of the vehicle. The surest way to achieve this goal is to register some biological attribute of the user with the vehicle interface. The most widely used biological attribute that identifies users is their picture. The second most useful, and probably the easiest for an onboard system to analyze, would be a user's fingerprint. In another embodiment of the present invention, once SmartCard 1015 is read by SmartCard Reader 1010 and authorized by Onboard Computer 20, the user is then required to input User's Finger 1025 via Fingerprint Reader 1020. Onboard Computer 20 then compares the user's fingerprint pattern to either a fingerprint identified with the user's data stored in onboard Memory 22 or stored on SmartCard Memory 1016. Once the user has been identified by Onboard Computer 20 as the rightful possessor of the SmartCard 1015, Onboard Computer 20 then allows the user to access the highest level of security authorized within Onboard Computer 20.

Verification of a user's ID may be accomplished by a number of other means, including Touch Pad 1060 or Number Pad 1070 via Graphical User Interface (GUI) 1080. While GUI 1080 is advantageous, it is not essential to practice the present invention. In fact, GUI 1080 may include Touch Pad 1060 or it may not, or it may include Number Pad 1070 or it may not, or any one of the three could be used in combination. In another embodiment, the present invention may require user identification via a voice print stored in system Memory 22 or on SmartCard 1015 Memory 1016. In that case, User Interface system 28 includes Microphone 1030. The user interfaces with the system by inputting User's Voice 1035 to Microphone 1030 and then Onboard Computer 20 compares the voice pattern with that of the user's voice pattern stored in system Memory 22 or SmartCard 1015 Memory 1016.

Other possible means of verifying the user's identity include the user's iris pattern. In this case, CCD Camera 1040 would input an image of User's Eye 1045 to Onboard Computer 20 for analysis and comparison with an iris pattern stored in system Memory 22 or on SmartCard Memory 1016. In another embodiment, User Interface 28 might include a sample of the user's handwriting within system Memory 22 or within SmartCard Memory 1016. The user would input a pre-determined sentence or series of words on Touch Pad 1060 as directed by the output of GUI 1080. Onboard Computer 20 then compares that series of slashes and gestures with the pattern stored in system Memory 22.

In another embodiment of the present invention, the user is merely required to enter the proper personal User's PIN 1075 via Number Pad 1070. Although generally the personal identification number is an unchanging number that the user always possesses, recently and with the advent of GUIs, the personal identification number is more than merely a number. For instance, the personal identification number can actually be an operation the user applies to a number, or an 'algorithmic password.' An example of an algorithmic password is to display a number to the user, such as '1234,' via GUI 1080. An algorithm known only to the user might be to subtract each of the outside digits from 10 and transpose the two inner digits. Thus, in response to seeing the number '1234,' the user inputs the number '9326' on GUI 1080. Even someone watching the user input that number would have no idea what algorithm the user applied to the display number, as the operation is known only to the user. More complicated algorithms can be formulated to test the dexterity of the user. Such dexterity tests are well known as effective in deterring intoxicated users and users who are incapable of safely operating a vehicle due to lack of sleep or illness.

In the final embodiment, User Interface 28 may include Breathalyzer 1050 to test User's Breath 1055 for alcohol content. A user that has been prone to drive while under the influence of drugs or alcohol would be required to demonstrate sobriety before being allowed to operate the vehicle. In this case, User's Breath 1055 can be analyzed by Onboard Computer 20 to detect the presence of known intoxicants. The user may be given several opportunities to pass the breathalyzer test before the user is de-authorized and the vehicle is disabled by Onboard Computer 20.

Finally, a user possessing a sufficiently high security level, such as a master user or an administrator, may authorize subsequent identification verification by proxy, thereby allowing access to certain onboard systems by users which have been denied access on a verification basis. This is an important feature for resolving identification verification problems brought about by failure of an identification verification subsystem.

An important aspect of the present invention is that one or all of these identification verification subsystems can be included in User Interface system 28. The advantage of SmartCard 1015 is that it contains Memory 1016, which can be updated and obliterated while not in contact with Onboard Computer 20. Unlike onboard computer Memory 22, SmartCard 1015 can be read and updated while the user is not in the vehicle, in fact while the vehicle is not even in the user's possession. Therefore, the user specific preferences stored on SmartCard Memory 1016 can be updated by someone other than the user, placing the user at the mercy of the fleet dispatcher or vehicle owner or parents, or whomever is ultimately responsible for the vehicle. Also, the SmartCard might contain user preferences for a variety of different vehicles.

Alternatively, SmartCard Memory 1016 contains user specified parameters in an independent device format. By using an independent device format for storing user specified parameters, the user may set specified parameters which are desired for use by a variety of different vehicles and vehicle types. The device-independent parameters would then be transformed into device-dependent parameters by the onboard computer of any vehicle in which the Smart-Card is inserted. While some parameters may require some fine tuning or tweaking once the user becomes accustomed to each different vehicle, the majority of the user specified parameters will fulfill the user's expectations without tweaking. Tremendous memory savings are achieved by storing user specific parameters in device-independent format on the SmartCard. Rather than storing multiple sets of user specific parameters on a variety of different vehicles, the one set of user specified parameters which is stored on the SmartCard is transformed into device-dependent parameters by any onboard computer of a specific vehicle into which the SmartCard is inserted.

Figure 11:
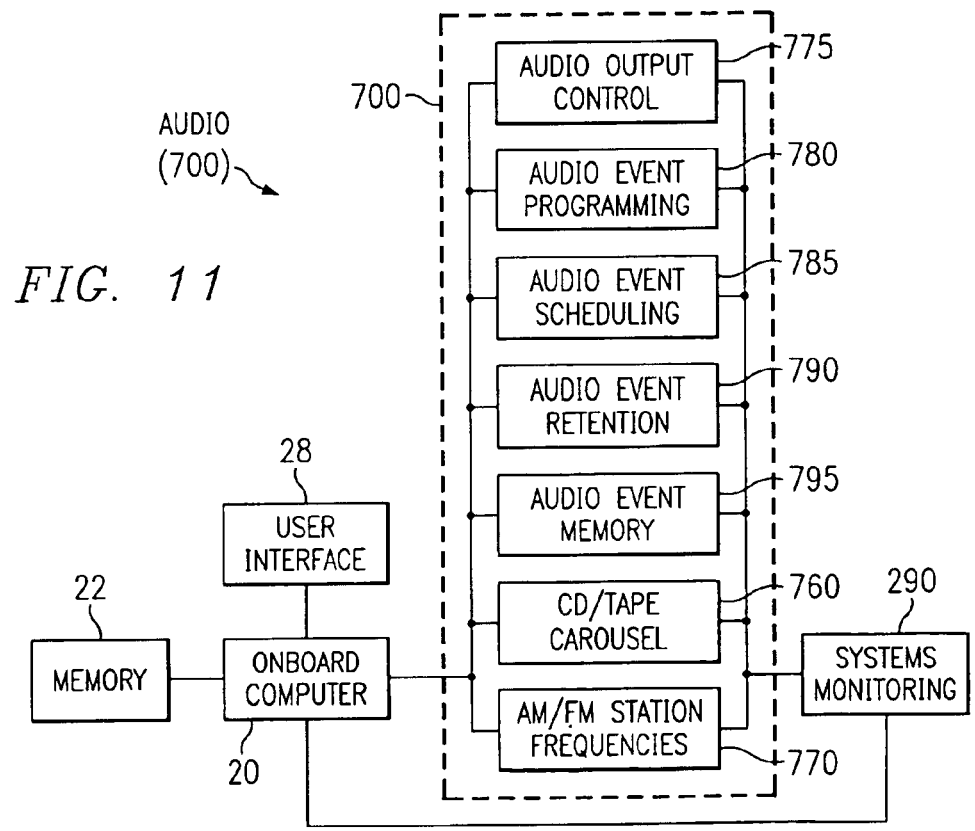
FIG. 11 depicts another embodiment of Audio system 700 as defined by the present invention.

FIG. 11 depicts another embodiment of Audio system 700 as defined by the present invention. In FIG. 11, Audio system 700 is further divided into various subsystems of the present invention which were delineated in FIG. 7 as Volume subsystem 710, Balance subsystem 720, Fade subsystem 730, Tone subsystem 740 and Selector subsystem 750 and which are now combined in Audio Output Control subsystem 775. In addition, the present invention now includes Audio Event Programming subsystem 780, Audio Event Scheduling subsystem 785, Audio Event Retention subsystem 790 and Audio Event Memory subsystem 795. Audio system 700 still contains CD/Tape Carousel subsystem 760 and AM/FM Station Frequencies subsystem 770.

Figure 12:
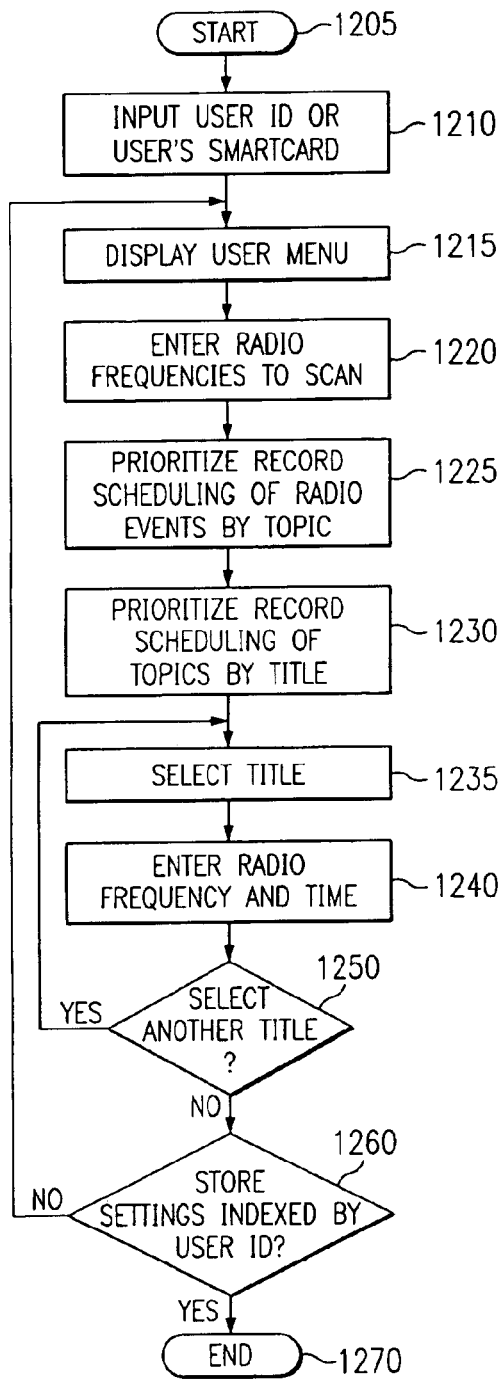
FIG. 12 depicts the process of the present invention.

The process of the present invention is illustrated in FIG. 12. The process starts at step 1205. The user enters the user's ID via Touch Pad 1060 of GUI 1080 or Number Pad 1070 of GUI 1080. Alternatively, the user may swipe SmartCard 1015 into SmartCard Reader 1010 (step 1210). A menu of the available audio programs is then displayed to the user via User Interface 28 (step 1215). In one embodiment of the present invention, the user is then required to enter the radio frequencies or call signs of the radio stations the user requires the system to scan for the audio events to be acquired in later steps (step 1220). The user then prioritizes the radio events which are to be recorded or memorized by topic (step 1225). The topics that are to be recorded are then further prioritized by title (step 1230). Alternatively or additionally, rather than selecting audio events by topic and by anticipated title and having the radio automatically scan frequencies for airings of those events, the user may select the specific title of a preferred radio program (step 1235). The user may then enter the radio frequency and the time that this program will be aired (step 1240). The user may then select other titles (step 1250) by repeating the process at step 1235 until no other titles are to be selected. This type of programming is similar to programming a VCR to record favorite television programs. The process then passes control to step 1260 where the user may store the settings, indexed by the user's ID (step 1260). If the user is unhappy with the settings the user may return to step 1215 and repeat the process. On the other hand, if the user is happy with the selections the process ends at step 1270. While the process illustrated in FIG. 12 is similar to that of programming VCR recordings, generally the user plays back VCR recordings at leisure so no playback mode specifications are necessary.

Figure 13A:
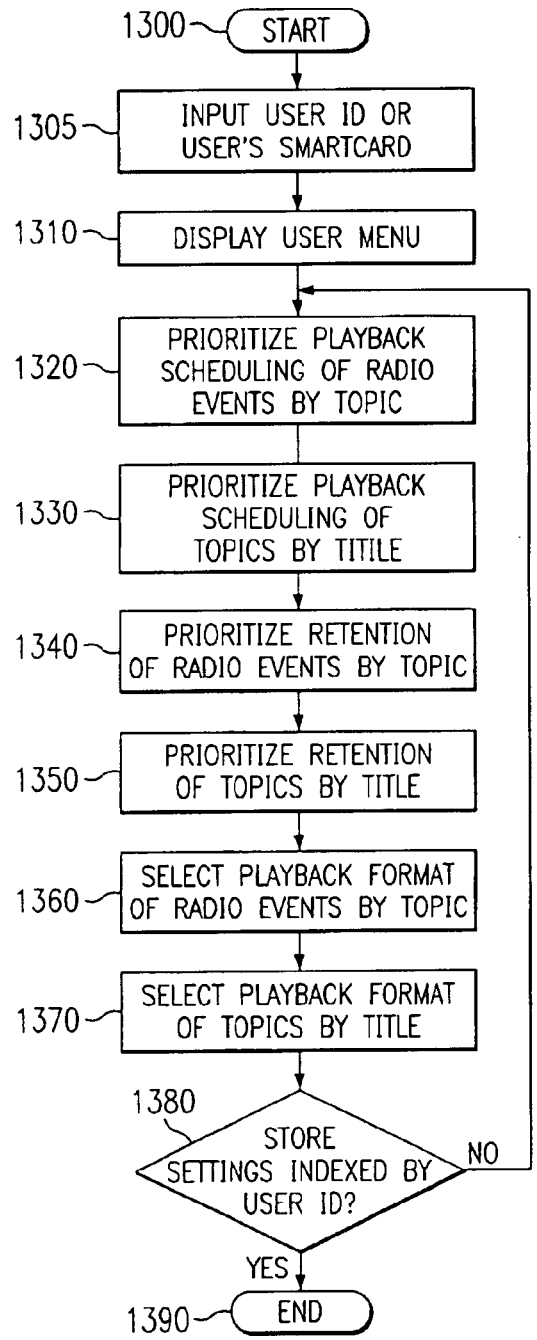
FIGS. 13A and 13B illustrate the playback mode of the present invention.

In FIG. 13A, the process starts at step 1300. At step 1305, the user enters a unique user ID or user SmartCard as described above with respect to FIG. 12. GUI 1080 displays the user menu at step 1310. Next, the user is required to prioritize the playback scheduling of radio events by topic (step 1320). This information is used by Audio Event Scheduling subsystem 785 for scheduling audio events by topic. The user then prioritizes the playback scheduling of topics by title (step 1330) and Audio Event Scheduling subsystem 785 uses this information to further refine the schedule of playback for this specific user.

The user is then required to prioritize the retention of radio events by topic (step 1340). Prioritizing the retention of radio events enforces a strict regiment that deletes lower priority information stored in Audio Event Memory subsystem 795. Certain events are more important to certain users than other events that may nonetheless be more important than yet other events. For instance, a current weather forecast is extremely important topically as are certain news broadcasts. However, a weather forecast is no longer current and therefore of virtually no importance the following day, especially when taken from the perspective of the vehicle operator whose objective is to navigate through current weather conditions. Therefore, in one example, weather forecasts would be retained only as long as they are current and automatically overwritten by the next available weather forecast. In the case of news broadcasts, on the other hand, the system may retain two or three previous news broadcasts along with the current news broadcast or, in other embodiments, the user may select to retain only the most recent news broadcast. Other programs, such as information programs, may be retained for a number of weeks. For instance, an event that airs weekly, such as a political round table talk, might be current but also still useful some weeks after the time it is aired and, therefore, might remain in Audio Event Memory 795 for several weeks. Other radio event topics, such as home improvement, self improvement, panel discussions or vehicle maintenance, might remain in Audio Event Memory 795 much longer even if they are not particularly topical but are designated as relatively important to a particular user. The user is then required to prioritize retention of the topics by title (step 1350). Therefore, within a certain topic, such as car repair, the user may have several radio programs to select from within a week's time. The user may particularly care for one or two of the programs and yet not care for the rest of them. Conveniently, the system would prioritize programming depending on the user's preference by title.

Although other implementations of the present invention are possible, it is important to note that this system gives the user extreme flexibility in both recording a particular program and playing back that particular program. For instance, if the user especially cares for a particular child development panel discussion program that is aired at a certain time and does not particularly care for a second child development program that is aired at a different time, the user can prioritize the recording of these two events as illustrated in FIG. 12. If the program the user enjoys is not aired or cannot be recorded, the system may still record the second program. Then in playback mode, if the user enjoys the topic of child care over any other topic of radio program, even though the user's favorite child care program has not been recorded, the system may schedule in its place the playback of a child care program having a lower priority.

Next the user selects a playback format for radio broadcast events by topic (step 1360). This selection is performed by the Audio Event Programming subsystem 780. The user then selects the playback format of particular topics by title (step 1370). Next the user is asked whether or not the settings should be stored by user ID. If the user is unhappy with a selection, the process returns to step 1320 to reinitialize the system (step 1380). If the user's selections are acceptable the process ends at 1390.

Figure 13B:
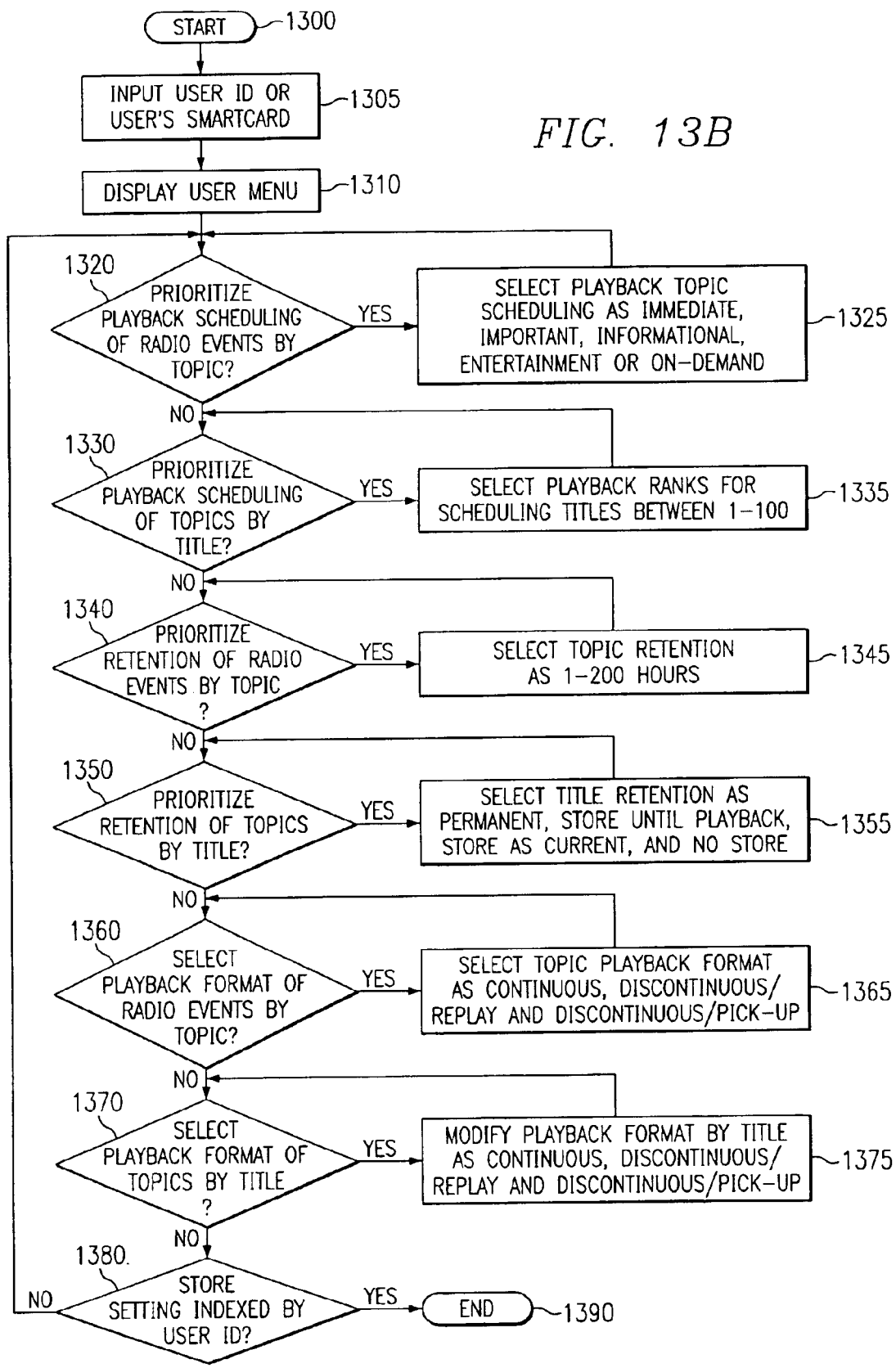

FIG. 13B illustrates the playback mode of the present invention in more detail. Steps 1300 to 1310 correspond to steps 1205 through 1215 of the previous illustration in FIG. 12. The user prioritizes the playback scheduling of radio events by topic at step 1320. The user then selects the playback topic priority scheduling, such as immediate, important, informational, entertainment or on-demand, in order to prioritize the scheduling of a specific topic (step 1325). The process then returns to step 1320. If no further prioritizing is requested by the user, the process passes to step 1330. There the user prioritizes playback scheduling of topics by title by ranking the particular titles within a topic on some scale (between 1 and 100 is exemplary) (step 1335). The process then passes back to step 1330. If no more titles are requested to be prioritized, the process passes to step 1340 where the user prioritizes the retention of radio events by topic. If the user intends to select topic retention, the user specifies the number of hours the topic should remain resident in Audio Event Memory 795 (step 1345).

Once the retention rankings of all topics have been selected and the number of hours the topics should remain resident in memory have been determined, the system passes the process back to step 1340. If the user is satisfied with the selections for the retention of radio events by topic, the system then passes the process to step 1350 where the user is asked to prioritize retention of topics by title. If the user has a preference for certain titles within topics, the user may rank those titles as being permanent, store until played, store as current or store until playback (step 1355). Thus, titles of topics remain in Audio Event Memory 795 only as long as the user intends and certain titles of topics may remain resident in Audio Event Memory 795 on a permanent basis or until the user intends to overwrite them. Others remain in memory only until played automatically by Audio Event Scheduling 785 or until played manually by the user. Still other titles of topics stored as current are overwritten automatically when a new identical or similar broadcast is stored on the system memory. Still others are stored until playback, whether there is another identical or similar title of topic in memory or not. Once the user has prioritized title retention preferences, the process returns to step 1350. If no more topics are intended to be prioritized by title, then the system passes to step 1360.

At step 1360, the user selects a playback format of radio events by topic. If the user has a preference, the user selects a format of continuous playback, discontinuous and replay playback, or discontinuous and pick-up playback (step 1365). For instance, a topic such as a panel discussion on child care might be assigned a format of discontinuous and pick-up. Thus, when the user is listening to the selected topic, if a news or information topic or title is recorded by Audio Event Programming system 780, the child care panel discussion may be interrupted for presentation of the information broadcast. Once the information broadcast is completed, the child care program will pick up where it left off. Alternatively, the user may select to hear an entire program in one sitting. In this case, if a program having a higher scheduling priority is received by Audio system 700, the ongoing program is interrupted for airing of the higher priority program and then, rather than being picked up from where it was interrupted, the initially airing program is replayed from its beginning. Other formats are possible; the above-mentioned formats are merely exemplary.

Once formats are selected, control is passed back to step 1360. If no more playback formats are to be selected by topic, control is passed to step 1370. The other playback format of topics is selected by title. At step 1375, the user may select to re-rank certain titles within a particular topic by designating a playback format different from the entire topic. For instance, higher priority events within the topic might be selected to be played back as continuous rather than in some type of discontinuous mode. Thus, while the topic playback format might be designated as discontinuous and replay mode, one or more of the radio events that are more significant to the user might be selected for a continuous playback format. Once the user has selected all of the playback formats by title, control is passed back to step 1370. If no more formats are selected, control is passed to step 1380 where the user is asked to store the selected index by user ID. If the user is not happy with the selections, control is passed back to step 1320 for re-initialization of the process. Alternatively, because the entire menu is being displayed on GUI 1080 the user may select any step for modification and return then to step 1380 to store the user settings indexed by the user's ID. Once that is complete, the process ends at step 1390.

An important feature of the present invention is that, while a vehicle remains idle, Audio Event Memory 795 may be continually updating broadcast programs specified by the user. The vehicle could also be connected either to the fleet control via Fleet Docking Port 540 or the user's home via Home Docking Port 560. This is extremely convenient for a user on a limited time schedule. One example is the daily rush of the typical commuter. Often the operator of the vehicle spends five, ten or fifteen minutes of the morning routine catching up on news, weather and traffic reports in order to plan a route to the office or business. A system such as the present invention, which automatically records these reports and plays them back immediately upon the user entering the vehicle, may save the user that five to fifteen minutes early in the morning. Thus, when a user enters the car and is identified to Onboard Computer 20 via User Interface 28 by inputting a user ID number or SmartCard as in step 1305, the user is automatically greeted by the local traffic report, news and weather. Thus, almost before exiting the driveway, the user has a good idea of what travel route is best at that time. Such immediate availability of these reports is even more crucial for operators of vehicles other than cars or trucks. For instance, light aircraft and marine vehicles are particularly susceptible to changes in weather. In alternative embodiments of the present invention, news, weather and traffic reports can be integrated with Navigation and Tracking system 600, and a travel route for the vehicle automatically determined before the user even enters the vehicle.

Finally, vehicle operators who are routinely required to traverse long distances will have a steady stream of current and topical information from which to select. As the vehicle moves into and out of broadcast coverage areas, the vehicle itself contains a menu of programming that the user has pre-selected in Audio Event Memory 795. Therefore, rather than the user manually switching stations or flipping back and forth from CD to radio, or merely changing tracks and titles on the CD, tape and radio, these events are programmed and prioritized by the user in order to give the user the best combination of topics and titles available.

In still other embodiments of the present invention, the user may selectively reduce the amount of content in any one event, topic, or titles within the topics. For instance, the user may select to have a particular program recorded by Audio Event Memory 795, commercial free. Audio Event Programming 780 identifies commercials during the program and switches off Audio Event Memory 795 during the airing of the commercials. In other embodiments, Audio Event Programming 780 may selectively compress certain audio events. Thus, the playback length of certain events, such as panel discussions, may be reduced by 10 percent or so from the original broadcast length. While the user may notice some increase in pitch of the voices of these panel participants, the overall audio quality would be acceptable.

In a final embodiment of the present invention, the program retention and playback formats are indexed by user ID. Audio Event Memory subsystem 795 must contain enough space for several users. As a user enters the car and is identified by Onboard Computer 20, the user's audio preferences are acquired from system Memory 22 and implemented through Audio system 700. It is assumed that every user would have a unique set of preferences and very little overlap among users would occur. Therefore, at some point, especially if a number of different users operate the same vehicle, Audio Event Memory 795 would become full. In a further embodiment, the users would be prioritized. For instance, a user having a master security level would be able to rank the priority of other users. This could be done in a number of different ways. For instance, high level users may have complete priority over other users. Thus, if Audio Event Memory 795 is completely filled with programming events selected by the master level user, no memory would be available for other users. Alternatively, each user may be assigned a pre-defined section of Audio Event Memory 795 to be filled in any manner desired.

Finally, each user may be authorized to store only events having high playback priority. Thus, topics having immediate and important priority for each user may be automatically given priority over any user's lower priority playback scheduling parameters. Thereby, the most important programming for each user would be guaranteed available when the user enters the vehicle.

FIG. 22 illustrates the audio data structure implemented in the present invention. In a preferred embodiment of the present invention, an audio data structure 2200 is stored in a memory. The audio data structure may be indexed to the user and stored in computer Memory 22. Alternatively, audio data structure 2000 may be stored on a user's Smart-Card in Memory 1016 or may be stored in a memory contained in Audio subsystem 700. Audio data structure 2000 may be displayed on GUI 1080 or may be resident in one of the memories described above. Audio data structure 2200 is meant as an example of one possible embodiment and is in no way meant to limit the practice of the present invention. Audio data structure 2200 is broken down into several column groups: broadcast event identification (group 2202); a group of record preferences (group 2204); playback scheduling preferences (group 2206); memory retention preferences group (group 2208); and playback format preferences group (group 2210).

Audio data structure 2200 is compiled by using the process described with reference to FIGS. 12 and 13 described above. In the present invention, header row 2212 identifies the contents of each of the columns. Rows 2214 to 2226 illustrate the individual broadcast events. Example row 2214 illustrates a news topic identified in column 2213. Column 2215 is blank, noting that no title is to be given for the news. Therefore, the user must either designate a frequency, and time and day to record the topic, or the user may provide a variety of frequencies or call signs which the system can scan to locate the topic designated by the user.

Returning to row 2214, the user designates the frequency from which the program will be recorded. In this case, frequency 2217 is indicated as 590 AM. Other record preferences 2204 include time 2221 and day 2219 of the broadcast event airing. In the case of row 2214, the user has indicated to record Monday through Friday from five minutes to ten minutes past the hour (columns 2219 and 2221, respectively).

Next, the user indicates the playback scheduling preferences from playback scheduling group 2206. Preferences generally correspond to the topic or title of the program. In this case, the user has selected only a topic, so the user then designates playback topic priority 2223. In this case, the user has entered 'important.' Playback title priority 2225 remains blank because the user has not indicated a specific title.

Next, the user indicates retention parameters from retention preferences group 2208. First, the user enters the length of time for which a broadcast should be retained in memory. Again, priorities are generally based on topic and then title of the broadcast event. In the case of row 2214, the news topic will be held for a maximum of ten hours as indicated in topic retention priority column 2227. Again, title retention priority 2229 is blank because no title was indicated by the user in title field 2215.

The user can then designate number of copies to be retained 2221. In this case, only one copy need be retained. Therefore, as a new news broadcast is received, it writes over the old broadcast. Finally, the user designates memory stacking parameters 2233. In this case, the user has designated mono as the memory stacking parameter. However, the user may designate a number of parameters. For instance, the user may intend to store the program in stereo mode, which takes up much more memory space. Conversely, the user may intend to store the recording as a compressed mono with a compressability factor determined by the percentage of memory saved. For instance, mono compressed 20 would save approximately 20 percent of memory space over normal mono stacking mode.

Final preferences for the user to select are the playback format preferences from playback format group 2210. These preferences indicate how, or in what format, the broadcast event which is stored in memory will be played back. Playback topic format 2213 indicates that the user selected discontinuous/pickup format. In this case, the news event will be played back. However, if the broadcast event is interrupted, making it a higher priority broadcast event, the broadcast event in 2214 will be picked up where it left off. Again, because no title was specified, playback title format 2217 is left blank.

In another example, the user has selected a one-time event to be recorded on row 2226. In this case, topic 2213 is listed as a one-time event. Title event 2215 is listed as 'Clinton.' The user selected frequency 2217 for 590 AM, day 2219 for Monday, and time 2221 of between 8:00 p.m. and 10:00 p.m. The user has selected President Clinton's State of the Union Address to be recorded. The user selected playback topic priority 2223 as on-demand. This means that, unless the user specifically calls up this broadcast event, it will remain resident in memory until overwritten by a higher priority broadcast event. However, the user selected a relatively high playback title priority 2225 of 5. Therefore, the chances of the Presidential address being overwritten by another program are relatively slight.

The user selected the topic for retention priority 2227 as 50 hours. Therefore, that topic will be stored for 50 hours unless title retention priority 2229 contradicts topic retention priority 2227. In that case, title retention priority will take precedence, and in this case, the user selected title retention priority 2229 as permanent. Therefore, the 50 hours selected on topic retention priority 2227, which will remain in force for other one-time broadcast event topics as well, will be circumvented by the selection of permanent for this particular title.

The user selected one as the number of copies to be retained 2223 and selected a memory stacking algorithm 2213 of mono compressed by 10 percent. The user then selected discontinuous/pickup for playback topic format 2213; but as in the retention group parameters, the user then selected playback title format 2237 as continuous meaning that, although the general group will be played back in continuous/pickup format, this particular title will be played back continuously. Therefore, President Clinton's State of the Union Address will not be interrupted by another program event, no matter the priority, unless the user manually intervenes.

It is important to note that while the present invention has been described in the context of a fully functioning data processing system, those of ordinary skill in the art will appreciate that the processes of the present invention are capable of being distributed in a form of a computer readable medium of instructions and a variety of forms, and that the present invention applies equally regardless of the particular type of signal bearing media actually used to carry out the distribution. Examples of computer readable media include recordable-type media such as floppy discs, hard disk drives, RAM, CD-ROMs, and transmission-type media such as digital and analog communications links.

The description of the present invention has been presented for purposes of illustration and description but is not limited to be exhaustive or limited to the invention in the form disclosed. Many modifications and variations will be apparent to those of ordinary skill in the art. The embodiment was chosen and described in order to best explain the principles of the invention and the practical applications, and to enable others of ordinary skill in the art to understand the invention for various embodiments with various modifications as are suited to the particular uses contemplated.

What is claimed is:

1. A method implemented in a data processing system for storing broadcast events for playback at a later time, wherein the data processing system includes a broadcast receiver, the method comprising:

receiving a retention parameter for retaining a broadcast event, wherein the retention parameter is at least one of a topic, a title, a number of copies, or an indication of whether memory stacking is to be employed;

receiving a playback scheduling parameter for scheduling the broadcast event;

receiving a playback format parameter for playing back the broadcast event;

retaining the broadcast event according to the retention parameter in order to create a previously recorded broadcast event;

retrieving the previously recorded broadcast event according to the playback format parameter; and playing back the previously recorded broadcast event according to the playback format parameter.

2. The method according to claim 1, wherein the retention parameter is a topic and wherein the retention parameter is associated with the broadcast event and prioritized by the topic with respect to other broadcast events.

3. The method according to claim 1, wherein the retention parameter is a title and wherein the retention parameter is associated with the broadcast event and prioritized by the title with respect to other broadcast events.

4. The method according to claim 1, wherein the retention parameter is a topic and wherein the playback scheduling parameter is associated with scheduling the broadcast event and prioritized by the topic with respect to other broadcast events.

5. The method according to claim 1, wherein the retention parameter us a title and wherein the playback format parameter is associated with formatting the broadcast event playback and prioritized by the title with respect to other broadcast events.

6. The method according to claim 1, wherein the retention parameter is a tonic and wherein the playback format parameter is associated with formatting the broadcast event and prioritized by the topic with respect to other broadcast events.

7. The method according to claim 1 wherein a memory is included in the data processing system.

8. The method according to claim 1 wherein a memory is not included in the data processing system.

9. The method according to claim 1 wherein the step of retaining further comprises:

associating the selected broadcast events to a user.

10. A data processing system for storing broadcast events for playback at a later time, the system comprising:

receiving means for receiving a retention parameter for retaining a broadcast event, wherein the retention parameter is at least one of a topic, a title, a number of copies, or an indication of whether memory stacking is to be employed;

receiving means for receiving a playback scheduling parameter for scheduling the broadcast event;

receiving means for receiving a playback format parameter for playing back the broadcast event;

retaining means for retaining the broadcast event according to the retention parameter in order to create a previously recorded broadcast event;

retrieving means for retrieving the previously recorded broadcast event according to the playback format parameter; and playing means for playing back the previously recorded broadcast event according to the playback format parameter.

11. The system according to claim 10, wherein the retention parameter is a topic and wherein the retention parameter is associated with the broadcast event and prioritized by the topic with respect to other broadcast events.

12. The system according to claim 10, wherein the retention parameter is a title and wherein the retention parameter is associated with the broadcast event and prioritized by the title with respect to other broadcast events.

13. The system according to claim 10, wherein the retention parameter is a topic and wherein the playback scheduling parameter is associated with scheduling the broadcast event and prioritized by the topic with respect to other broadcast events.

14. The system according to claim 10, wherein the retention parameter is a title and wherein the playback format parameter is associated with formatting the broadcast event playback and prioritized by the title with respect to other broadcast events.

15. The system according to claim 10, wherein the retention parameter is a topic and wherein the playback format parameter is associated with formatting the broadcast event and prioritized by the topic with respect to other broadcast events.

16. The system according to claim 10 wherein a memory is included in the data processing system.

17. The system according to claim 10 wherein a memory is not included in the data processing system.

18. The system according to claim 10 wherein the retaining means for retaining further comprises:

associating means for associating the selected broadcast events to a user.

19. A computer program product, including instructions implemented in a data processing system for storing broadcast events for playback at a later time, embodied on a system readable medium, the instructions comprising:

instructions for receiving a retention parameter for retaining a broadcast event, wherein the retention parameter is at least one of a tonic, a title, a number of copies, or an indication of whether memory stacking is to be employed;

instructions for receiving a playback scheduling parameter for scheduling the broadcast event;

instructions for receiving a playback format parameter for playing back the broadcast event;

instructions for retaining the broadcast event according to the retention parameter in order to create a previously recorded broadcast event;

instructions for retrieving the previously recorded broadcast event according to the playback format parameter; and instructions for playing back the previously recorded broadcast event according to the playback format parameter.

20. A method implemented in a data processing system for storing broadcast events for playback at a later time, wherein the data processing system includes a broadcast receiver, the method comprising:

receiving a user identification;

receiving a retention parameter for retaining a broadcast event based on the user identification, wherein the retention parameter is at least one of a tonic, a title, a number of copies, or an indication of whether memory stacking is to be employed;

receiving a playback scheduling parameter for scheduling the broadcast event based in the user identification;

receiving a playback format parameter for playing back the broadcast event based on the user identification;

retaining the broadcast event according to the retention parameter in order to create a previously recorded broadcast event;

retrieving the previously recorded broadcast event according to the playback format parameter; and playing back the previously recorded broadcast event according to the playback format parameter.

21. A data processing system for storing broadcast events for playback at a later time, wherein the data processing system includes a broadcast receiver, the method comprising:

receiving means for receiving a user identification;

receiving means for receiving a retention parameter for retaining a broadcast event based on the user identification, wherein the retention parameter is at least one of a tonic, a title, a number of copies, or an indication of whether memory stacking is to be employed;

receiving means for receiving a playback scheduling parameter for scheduling the broadcast event based in the user identification;

receiving means for receiving a playback format parameter for playing back the broadcast event based on the user identification;

retaining means for retaining the broadcast event according to the retention parameter in order to create a previously recorded broadcast event;

retrieving means for retrieving the previously recorded broadcast event according to the playback format parameter; and playing means for playing back the previously recorded broadcast event according to the playback format parameter.

* * * * *

UNITED STATES PATENT AND TRADEMARK OFFICE
CERTIFICATE OF CORRECTION

PATENT NO. : 6,944,430 B2
APPLICATION NO. : 09/863909
DATED : September 13, 2005
INVENTOR(S) : Berstis It is certified that error appears in the above-identified patent and that said Letters Patent is hereby corrected as shown below:

Col. 23, line 52: before "a" delete "us" and insert --is--.

Col. 23, line 57: after "a" delete "tonic" and insert --topic--.

Col. 24, line 58: after "of a" delete "tonic" and insert --topic--.

Col. 25, line 14: after "of a" delete "tonic" and insert --topic--.

Col. 26, line 9: after "of a" delete "tonic" and insert --topic--.

Signed and Sealed this

Twelfth Day of December, 2006

JON W. DUDAS
*Director of the United States Patent and Trademark Office*